United States Patent
Choi et al.

(10) Patent No.: US 9,332,312 B2
(45) Date of Patent: May 3, 2016

(54) VIDEO DISPLAY DEVICE AND METHOD OF CONTROLLING THE SAME

(71) Applicant: LG ELECTRONICS INC., Seoul (KR)

(72) Inventors: Jiho Choi, Seoul (KR); Saehun Jang, Seoul (KR); Hyeonhui Kim, Seoul (KR); Jungdo Kim, Seoul (KR); Junhee Yeo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/553,565

(22) Filed: Nov. 25, 2014

(65) Prior Publication Data

US 2015/0264434 A1     Sep. 17, 2015

(30) Foreign Application Priority Data

Mar. 14, 2014   (KR) .......................... 10-2014-0030483

(51) Int. Cl.
| | | |
|---|---|---|
| *H04N 7/10* | (2006.01) | |
| *H04N 21/458* | (2011.01) | |
| *H04N 21/41* | (2011.01) | |
| *H04N 21/442* | (2011.01) | |
| *H04N 21/81* | (2011.01) | |
| *H04N 21/436* | (2011.01) | |

(52) U.S. Cl.
CPC ......... *H04N 21/458* (2013.01); *H04N 21/4131* (2013.01); *H04N 21/43615* (2013.01); *H04N 21/44231* (2013.01); *H04N 21/812* (2013.01)

(58) Field of Classification Search
CPC .................... H04N 21/4131; H04N 21/44231; H04N 21/812
See application file for complete search history.

(56) References Cited

U.S. PATENT DOCUMENTS

| | | | |
|---|---|---|---|
| 2007/0288331 A1 | 12/2007 | Ebrom et al. | |
| 2008/0281661 A1* | 11/2008 | Young ................... | G06Q 30/02 705/14.73 |
| 2012/0316984 A1 | 12/2012 | Glassman | |
| 2013/0275225 A1* | 10/2013 | Byeon ................ | G06Q 30/0267 705/14.64 |

FOREIGN PATENT DOCUMENTS

| | | | |
|---|---|---|---|
| EP | 2 362 335 A1 | 8/2011 | |
| EP | 2 562 967 A2 | 2/2013 | |

\* cited by examiner

*Primary Examiner* — Gigi L Dubasky

(74) *Attorney, Agent, or Firm* — Birch, Stewart, Kolasch & Birch, LLP

(57) ABSTRACT

A video display device performing wireless communication with a plurality of external devices is provided. The video display device includes a display unit, a memory formed according to driving of an external device and configured to store state information of the external device, a tuner configured to receive advertisement data including a plurality of content items selectively outputtable to the display unit, in real time; and a controller configured to control the display unit to output a content item matched to state information of the external device.

17 Claims, 21 Drawing Sheets

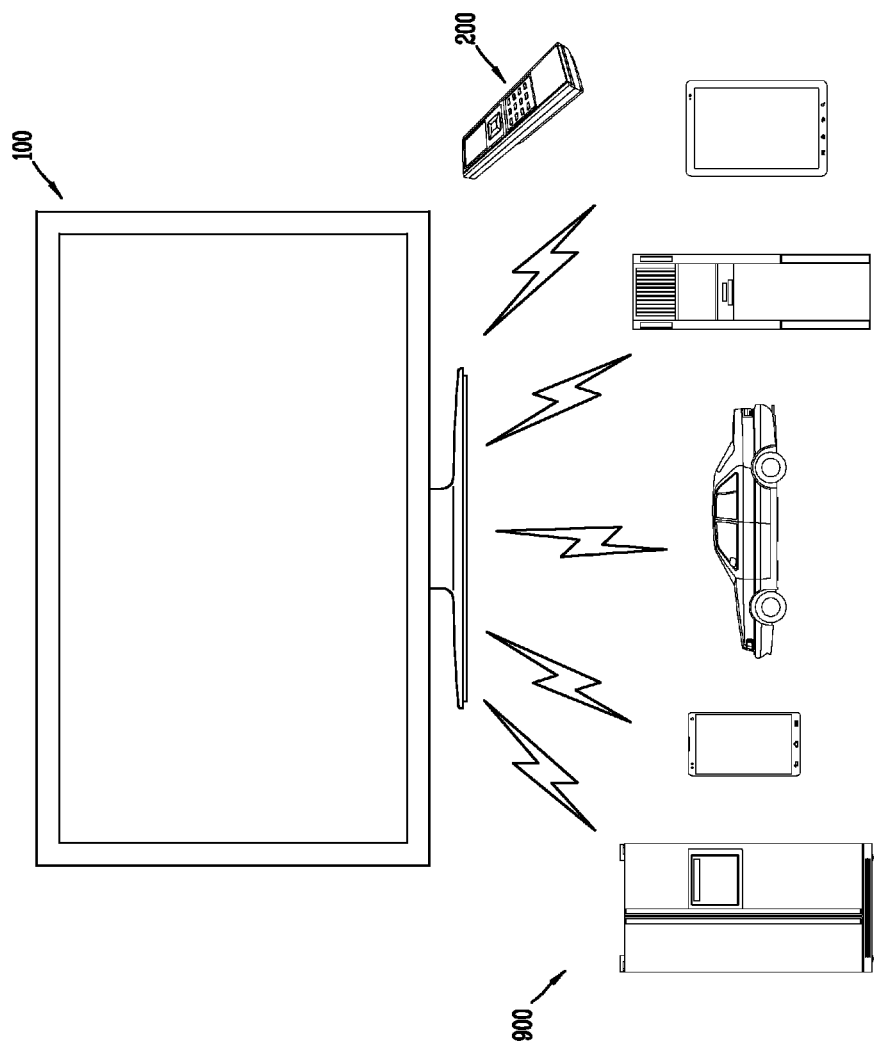

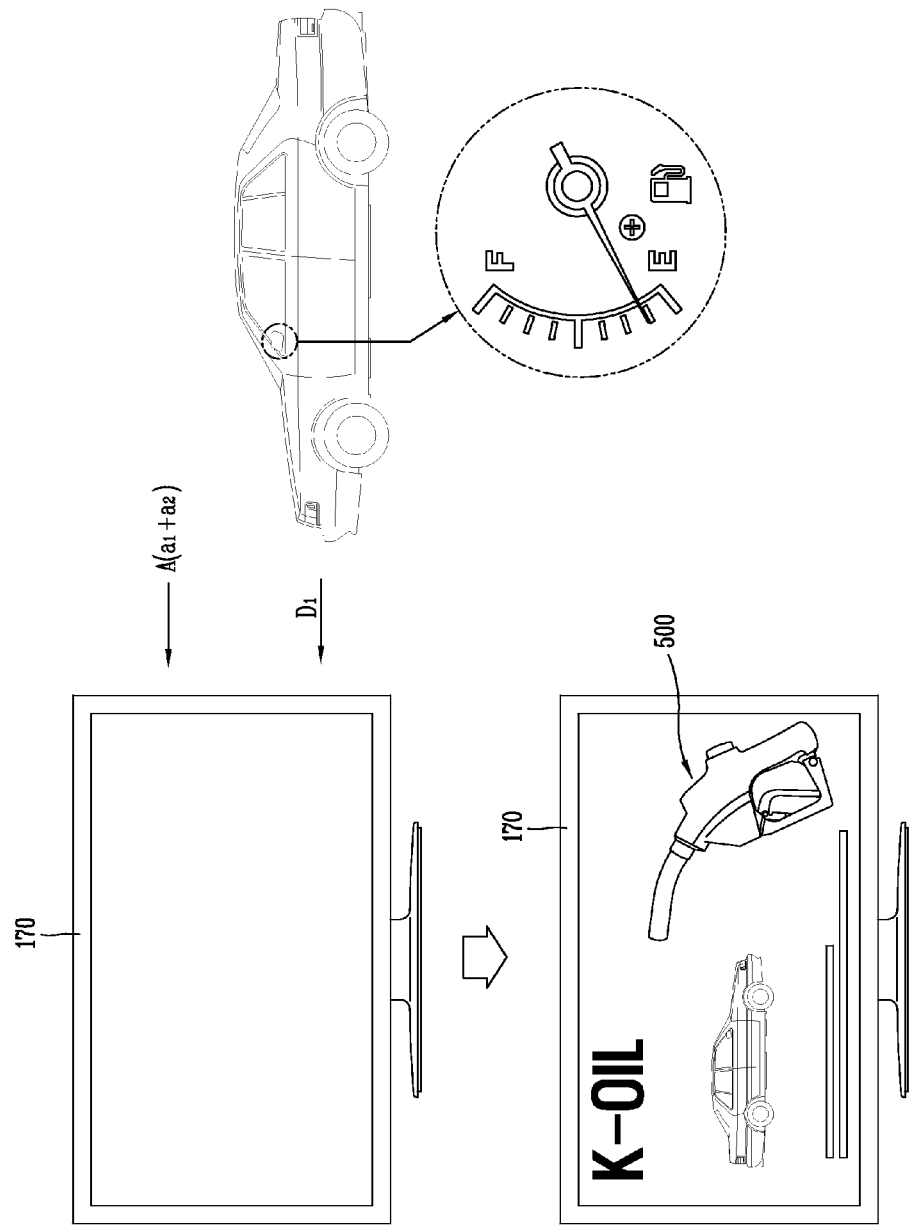

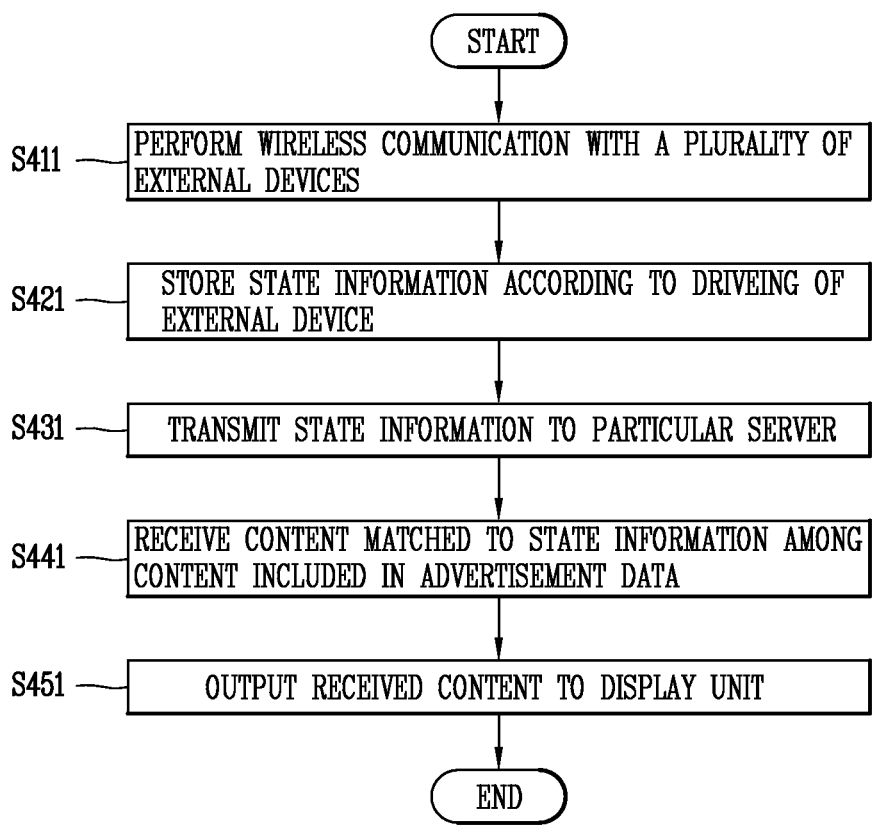

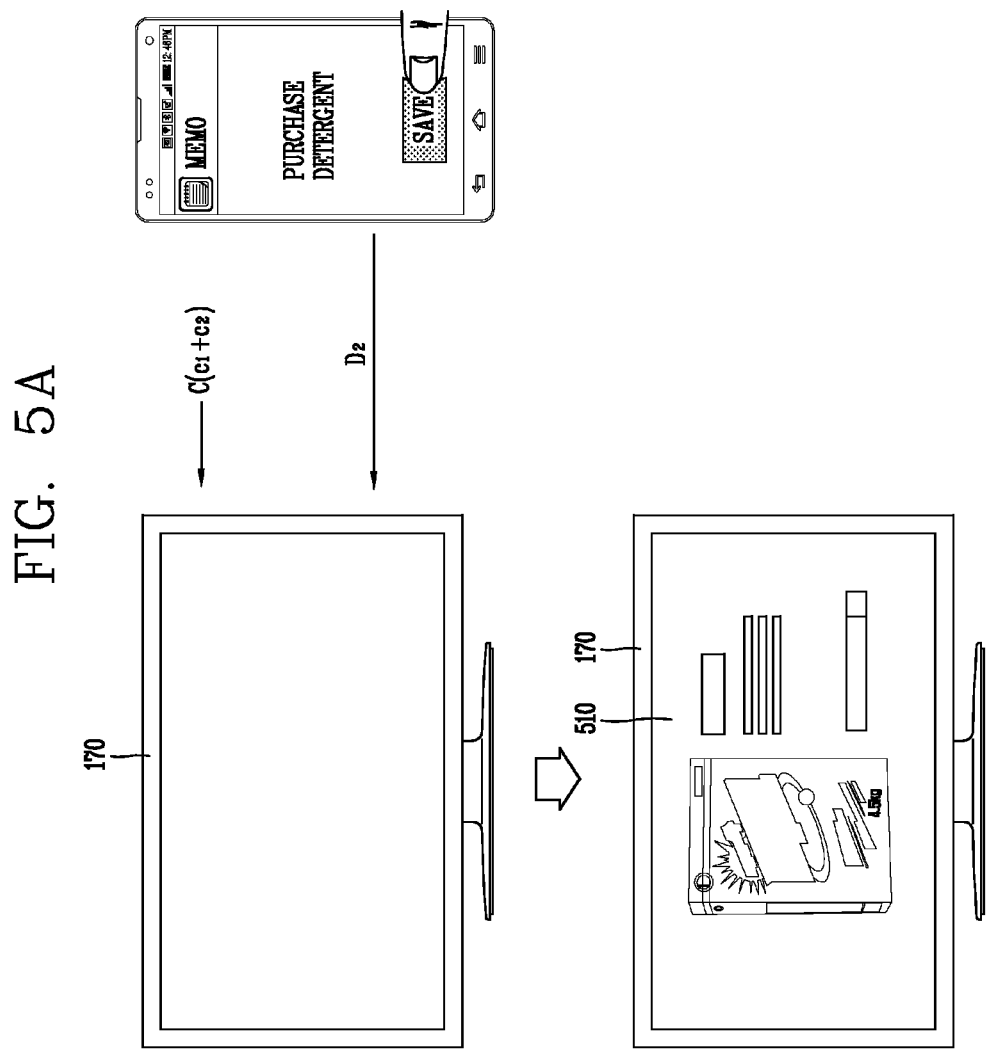

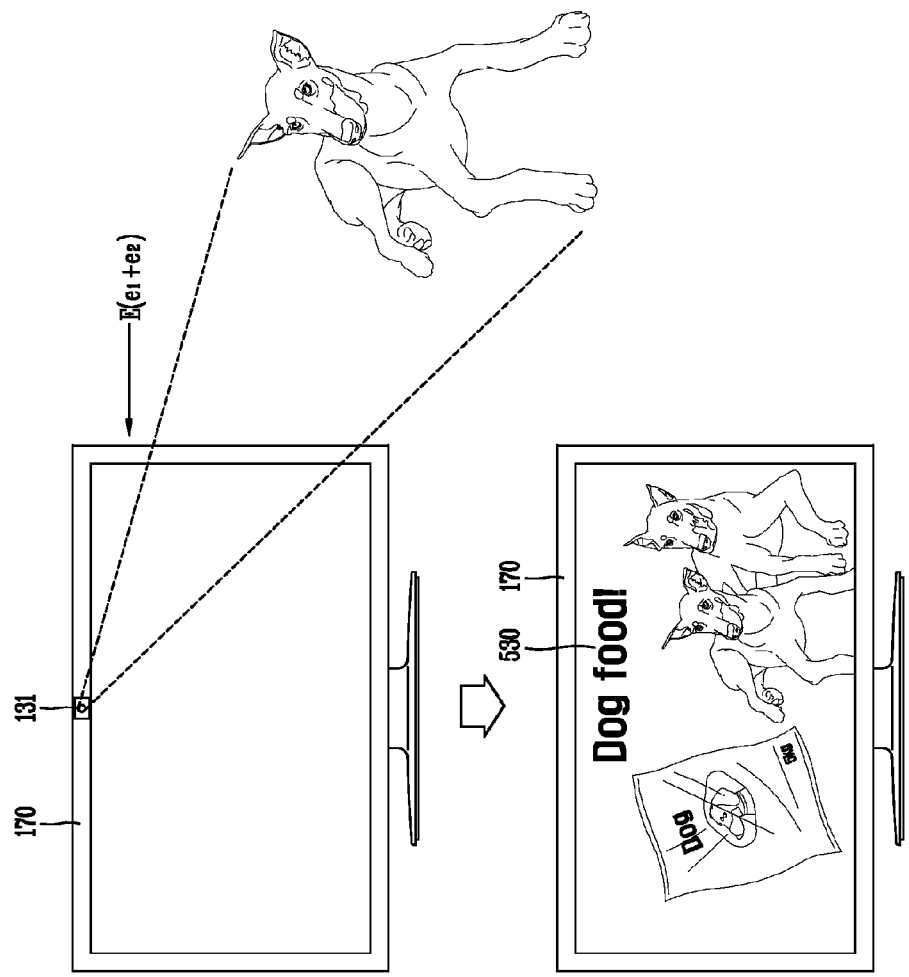

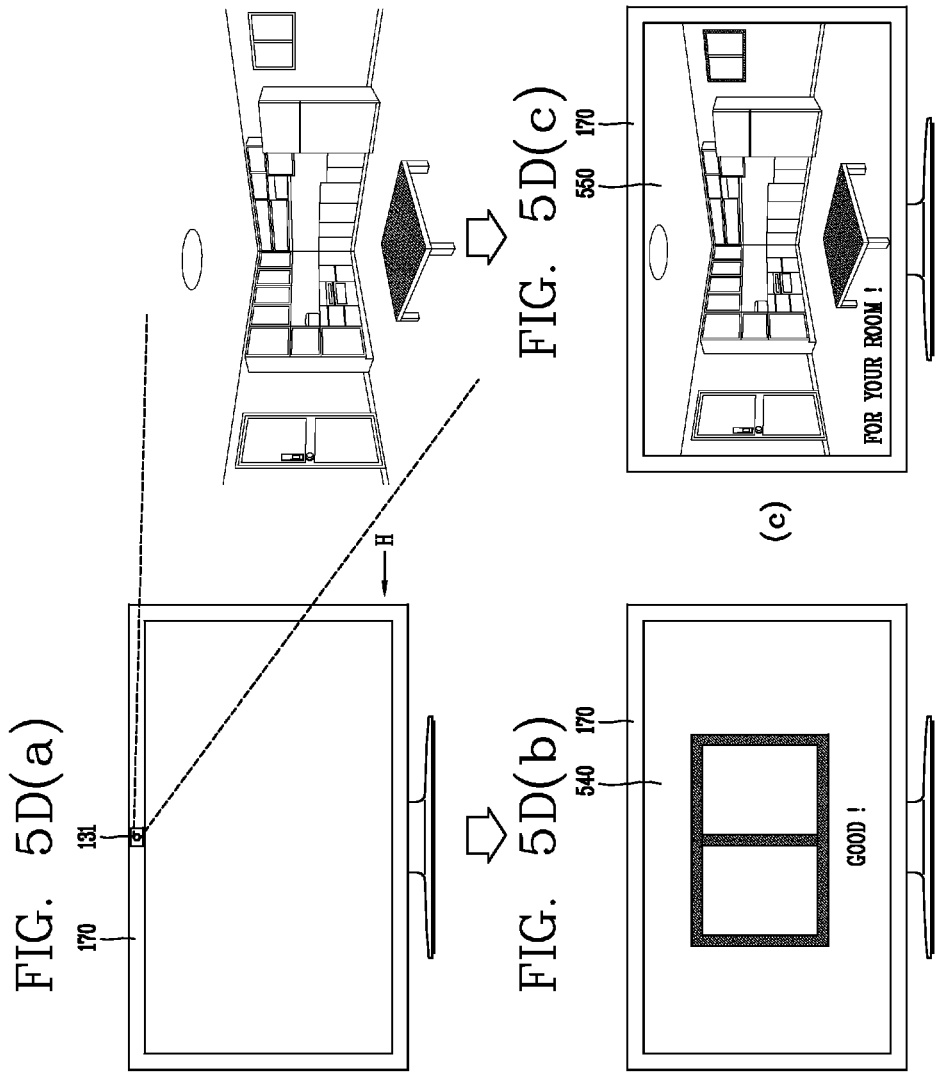

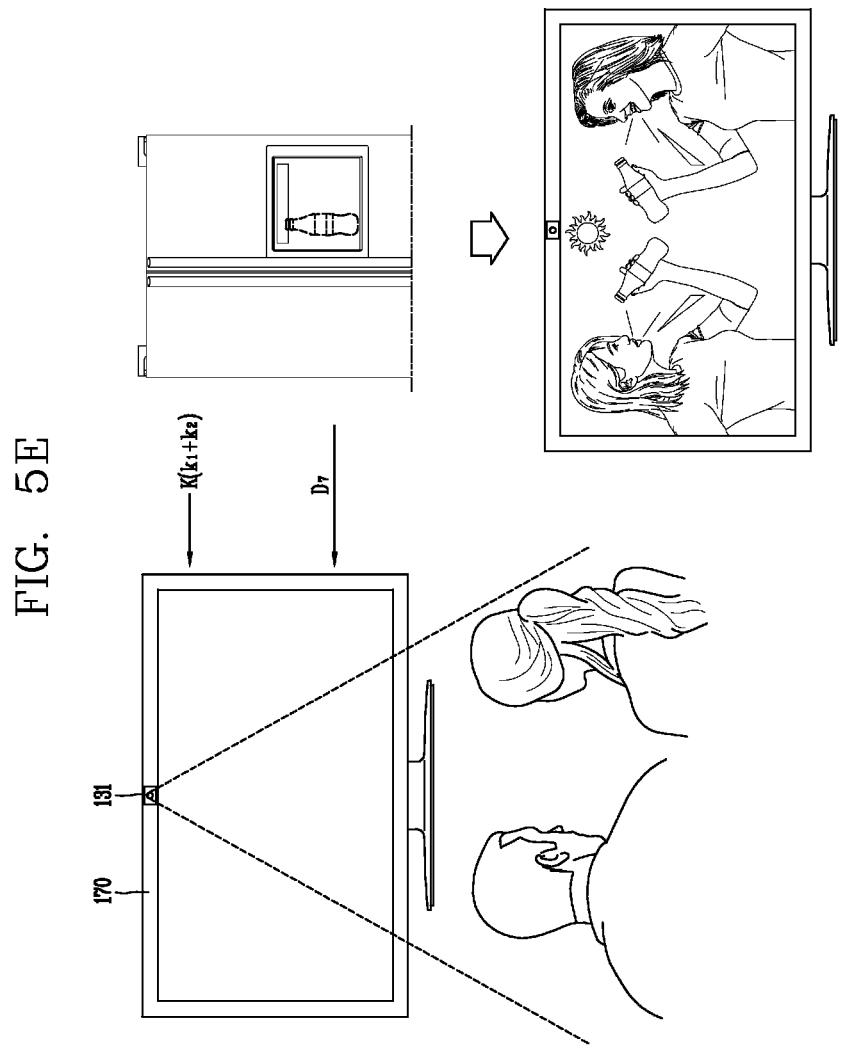

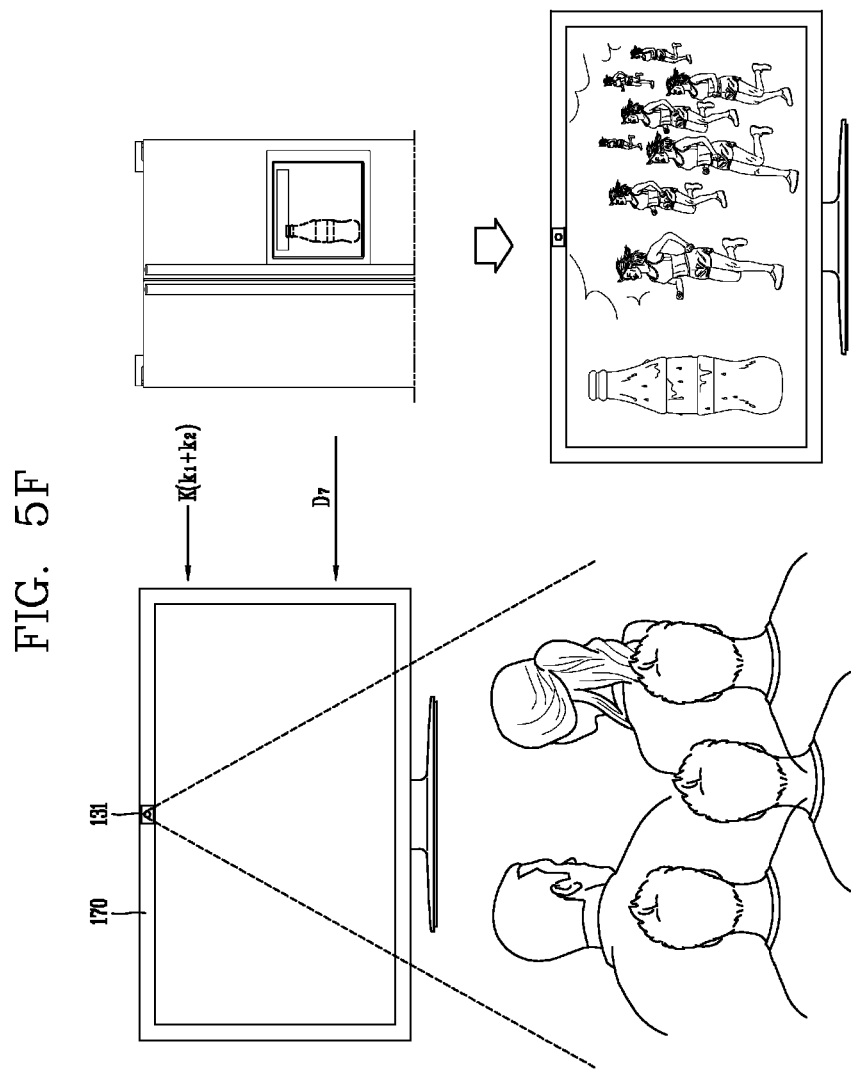

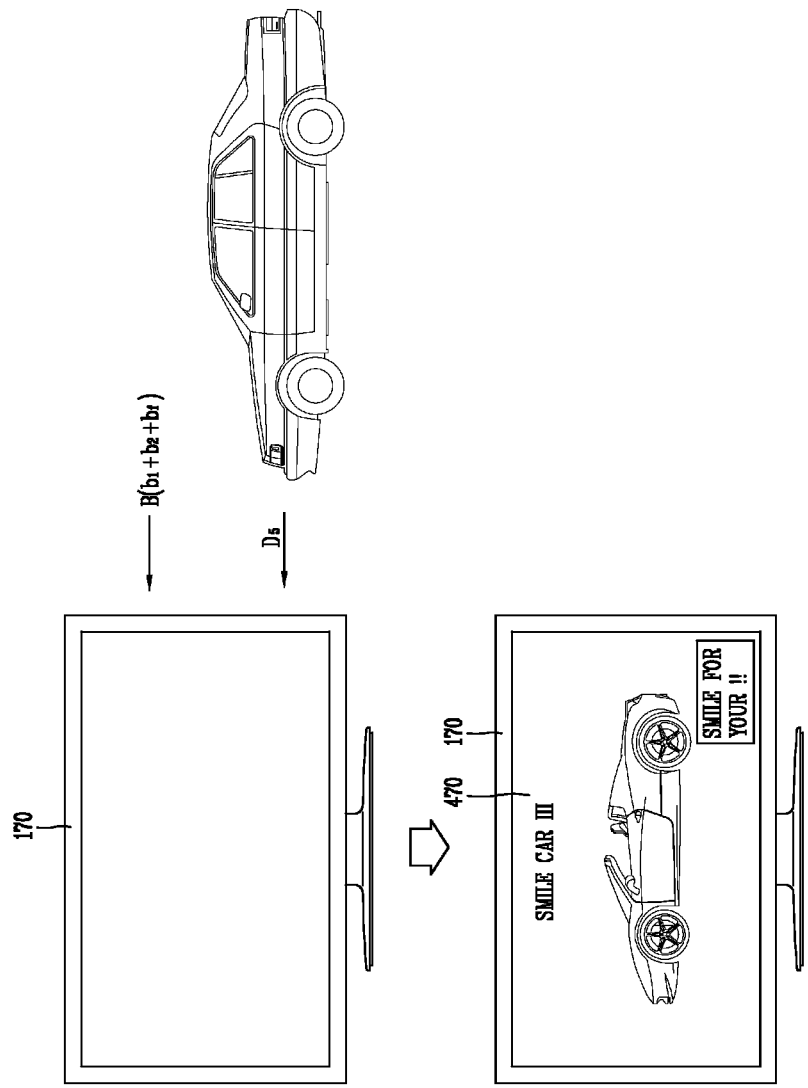

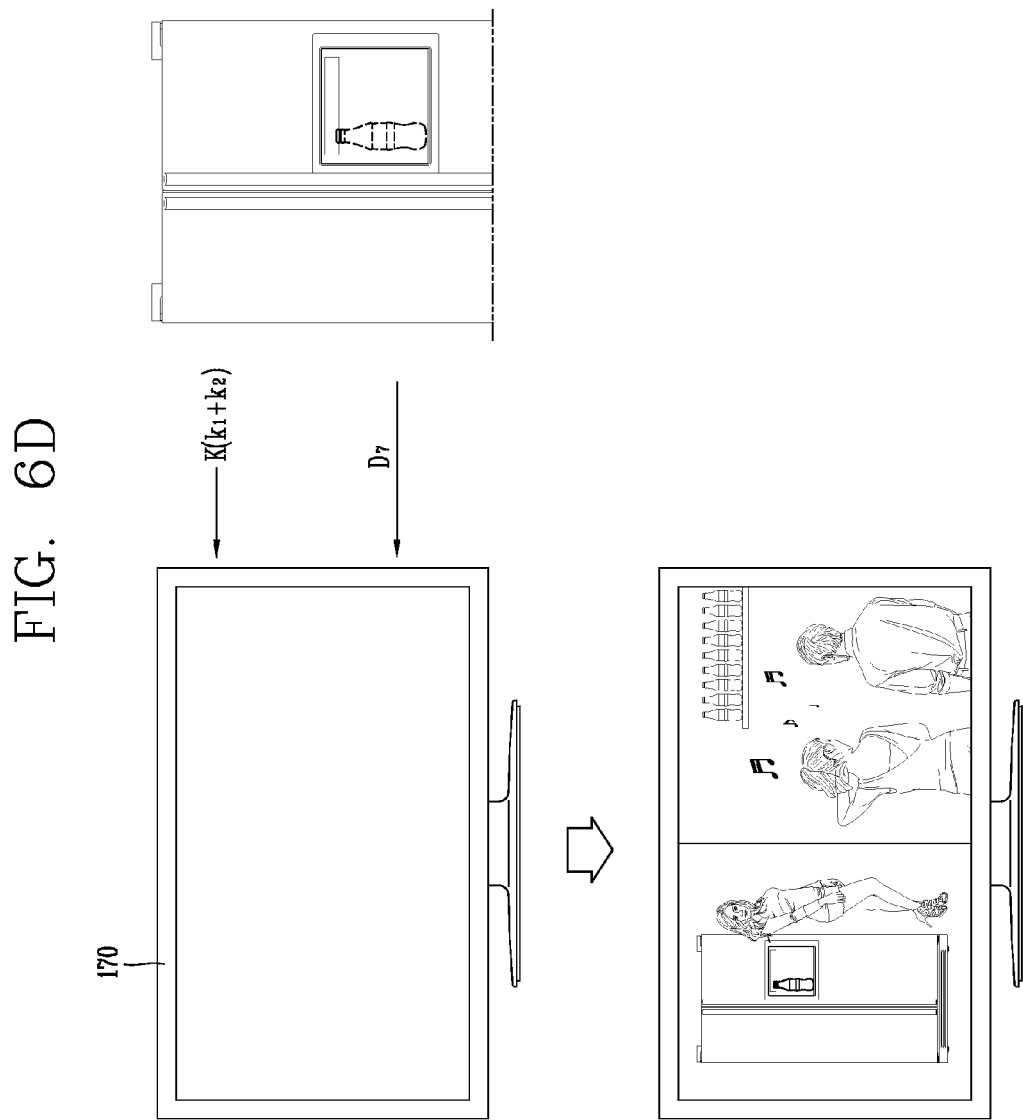

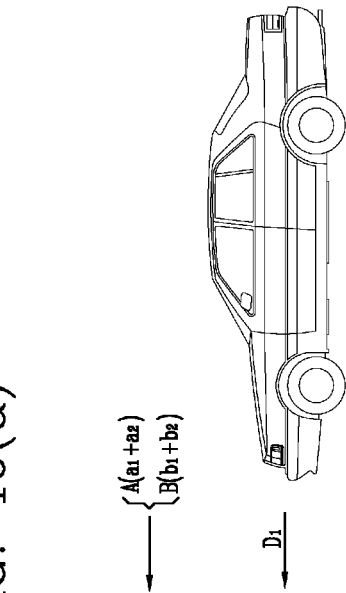
FIG. 10(a)
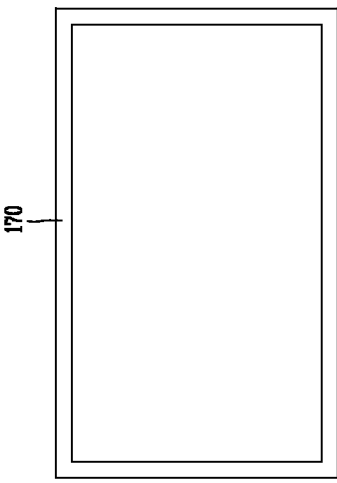
FIG. 10(b)
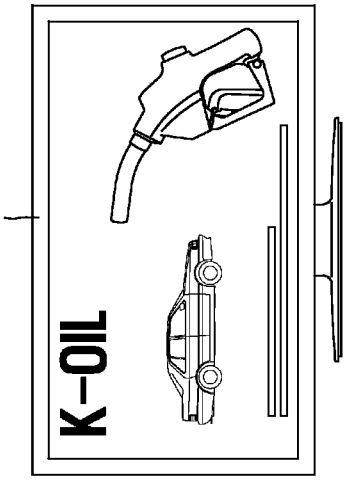
FIG. 10(c)
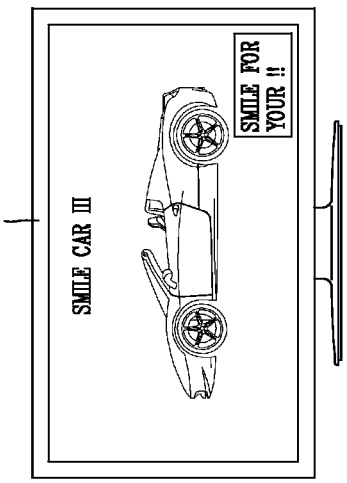

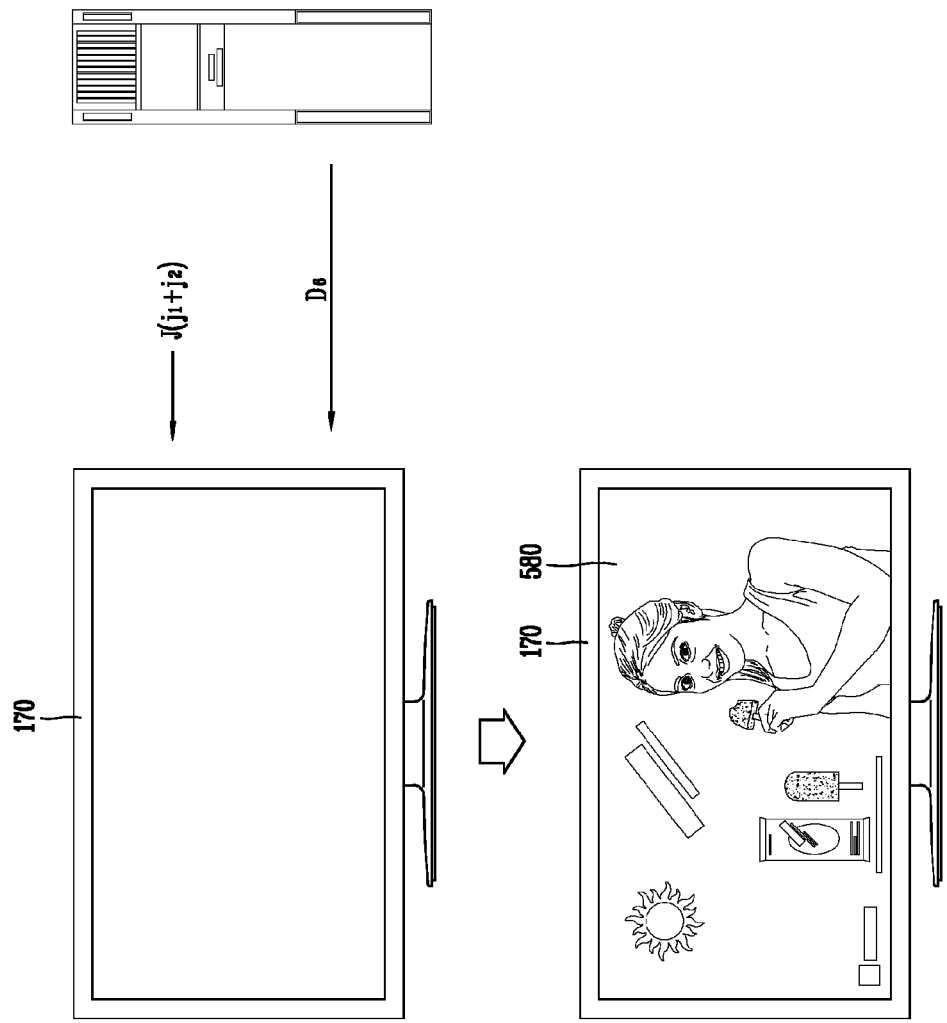

VIDEO DISPLAY DEVICE AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Application No. 10-2014-0030483, filed in filed in Republic of Korea on Mar. 14, 2014 the contents of which are incorporated by reference herein in it entirety.

BACKGROUND OF THE INVENTION

1. Field of the Invention

The present disclosure relates to a video display device outputting a received broadcast signal.

2. Background of the Invention

Video display devices include both a device for receiving and display a broadcast or recording and reproducing video and a device for recording and reproducing audio. Such video display devices include a television, a computer monitor, a projector, a tablet, and the like, for example.

As video display devices have been diversified in functions, they have been implemented as multimedia players having complicated functions such as capturing images or video, playing games, receiving broadcast signals, and the like, as well as functions of reproducing music or video files. In addition, recently, video display devices have been implemented as smart devices (e.g., smart TVs). Thus, a video display device may execute the Internet, or the like, or may interwork with a mobile terminal or a computer, and screen information displayed on the video display device may be selectively used. For example, screen information displayed on the video display device may be captured or stored so as to be stored in a memory, or the like, or may be utilized such that it is stored in a different output manner, or the like.

Recent video display devices have a function to interwork with a plurality of external devices to transmit and receive data. Thus, data stored in a plurality of electronic devices may be shared by the plurality of electronic devices by users. However, in case of a broadcast signal received by a tuner in real time, only designated information may be output, having a limitation in that only the same information is provided to every user.

SUMMARY OF THE INVENTION

Therefore, an aspect of the detailed description is to provide a video display device capable of optimizing information based on a broadcast signal and providing the optimized information to a user.

To achieve these and other advantages and in accordance with the purpose of this specification, as embodied and broadly described herein, a video display device performing wireless communication with a plurality of external devices, may include: a display unit; a memory configured to store state information of an external device formed according to driving of an external device; a receiving unit configured to transmit or receive at least one of the state information and advertisement data selectively outputtable to the display unit; and a controller configured to control the display unit to output at least a portion of the advertisement data matched to state information of the external device.

In an example related to the present disclosure, the state information may include information regarding the external device itself and information related to driving of the external device.

In an example related to the present disclosure, the state information may include data stored in a storage unit of the external device by a user, and the data may include at least one among text, an image, and a voice.

In an example related to the present disclosure, the advertisement data matched to the information related to the driving may correspond to information related to a target used to drive the external device and a target driven together with the external device.

In an example related to the present disclosure, the memory may store information regarding a storage date on which the state information was stored, together, and when a difference between the storage date and the current date is longer than a preset reference period, the controller may output advertisement data matched to the information regarding the external device itself, and when the difference between the storage date and the current date is shorter than or equal to the preset reference period, the controller may control the display unit to output advertisement data matched to the information related to driving of the external device.

In an example related to the present disclosure, the advertisement data may include a plurality of differentiated content items, and when the display unit is activated, the controller may transmit the state information to a preset server and control the receiving unit to selectively receive a content item matched to the state information among the plurality of content items.

In an example related to the present disclosure, the controller may control the receiving unit to receive the plurality of differentiated content items included in the advertisement data in real time, and the controller may control the display unit to output a content item matched to the state information, among the plurality of content items.

In an example related to the present disclosure, the video display device may further include: a camera configured to capture an image of an external environment, wherein the controller may analyze external environment information included in the image and select a content item matched to the external environment information together with the state information.

In an example related to the present disclosure, when there is no content item matched to the state information, the controller may select a preset basic content item among the plurality of content items.

In an example related to the present disclosure, the controller may control the display unit to output advertisement data to which additional state information received from a different external device and the state information are matched together.

In an example related to the present disclosure, the controller may control the display unit to combine screen information corresponding to the selected content item and the image and output the same.

In an example related to the present disclosure, the advertisement data may include a plurality of convent items of different versions with respect to a single target, and when the plurality of content items correspond to screen information in which at least one of a shape, a color, a size, and a usage state is differently displayed, the controller may control the display unit to output screen information related to at least one of a shape, a color, a size, and a usage state of at least one object included in the image.

In an example related to the present disclosure, additional information indicating a type of the external device may be received together with the receiving unit information, and the controller may control the display unit to output screen information including a graphic image of the external device based on the additional information and the matched advertisement data.

In an example related to the present disclosure, when the display unit is activated based on unique information input by the user, the controller may control the display unit to output the advertisement data based on state information including the unique information.

In an example related to the present disclosure, the controller may control the display unit to output screen information corresponding to the advertisement data, and the display unit may output an icon denoting the external device together with the screen information.

In an example related to the present disclosure, the controller may estimate required information corresponding to a target desired by the user based on state information generated according to driving of the external device, and the controller may select a content item matched to the required information.

In an example related to the present disclosure, the video display device may further include: a sensing unit configured to sense the current state of the video display device, wherein the controller may estimate the required information by using the current state together with the state information.

To achieve these and other advantages and in accordance with the purpose of this specification, as embodied and broadly described herein, a method for controlling a video display device may include: receiving state information according to driving of an external device; storing the state information; receiving advertisement data including a plurality of content items outputtable to a display unit in real time; selecting a content item matched to the state information of the external device; and outputting screen information corresponding to the selected content item to the display unit.

In an example related to the present disclosure, the method may further include: when the state information includes information regarding the external device itself and information related to driving of the external device, comparing a difference between a date on which the state information was stored and the current date with a preset reference period, wherein the selecting of a content item matched to the state information of the external device may include: when the difference is longer than the preset reference period, selecting a content item matched to the information regarding the external device itself, and when the difference is shorter than or equal to the preset reference period, selecting a content item matched to the information related to driving of the external device.

In an example related to the present disclosure, the method may further include: sensing the current state; estimating required information corresponding to a target desired by the user based on the current state and the state information according to driving of the external device; and selecting a content item based on the required information.

According to an exemplary embodiment of the present disclosure, a content item of advertisement data is selectively output according to state information of an external device used by a user. Thus, the user may be provided with information regarding substantially required goods (or product), and thus, a possibility to purchase the goods included in advertisement content can be increased, maximizing an advertisement effect.

Also, since the user is provided with an advertisement of goods having substantially high relevance with driving of an external device of the user, goods expected to be required for the user can be called.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 2 is a conceptual view illustrating an interaction between the video display device related to the present disclosure and an external input device.

FIG. 3B is a flow chart illustrating the control method of FIG. 3A according to an exemplary embodiment of the present disclosure.

FIG. 4 is a flow chart illustrating a control method according to another exemplary embodiment of the present disclosure.

FIGS. 5A through 5F are conceptual views illustrating a control method of providing advertisement data using state information.

FIGS. 6A through 6D are conceptual views illustrating a control method of outputting advertisement content based on additional information of an external device.

FIGS. 10(a) through 10(c) are conceptual views illustrating the control method of FIG. 9.

FIG. 12 is a conceptual view illustrating the control method of FIG. 11 according to an exemplary embodiment of the present disclosure.

DETAILED DESCRIPTION OF THE INVENTION

Figure 1:
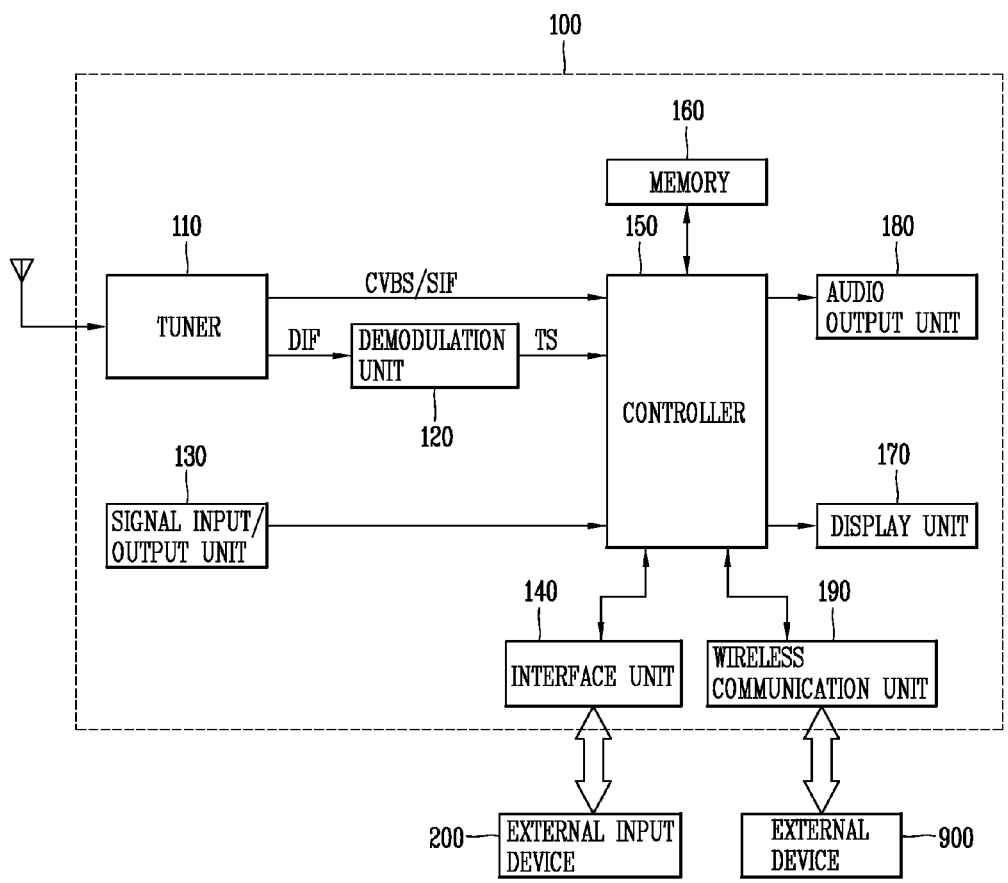
FIG. 1 is a block diagram illustrating a configuration of a video display device related to the present disclosure.

Hereinafter, exemplary embodiments will be described in detail with reference to the accompanying drawings such that they can be easily practiced by those skilled in the art to which the present disclosure pertains. In describing the present disclosure, if a detailed explanation for a related known function or construction is considered to unnecessarily divert the gist of the present disclosure, such explanation will be omitted but would be understood by those skilled in the art. Also, similar reference numerals are used for the similar parts throughout the specification.

In the present disclosure, a video display device may include a device for receiving and displaying a broadcast or recording or reproducing a video and a device for recording and reproducing audio.

FIG. 1 is a block diagram illustrating a video display device 100 in relation to the present disclosure and an external input device 200. The video display device 100 may include a tuner 110, a demodulation unit 120, a signal input/output unit 130, an interface unit 140, a controller 150, a memory 160, a display unit 170, and an audio output unit 180. The external input device 200 may be a separate device with respect to the video display device 100 or may be included as a component of the video display device 100.

Referring to FIG. 1, the tuner 110 selects an radio frequency (RF) broadcast signal corresponding to a channel selected by a user among RF broadcast signals received through an antenna, and converts the selected RF broadcast signal into an intermediate frequency (IF) signal or a baseband video/audio signal. For example, when the RF broadcast signal is a digital broadcast signal, the tuner 110 converts the RF broadcast signal into a digital IF (DIF) signal. Meanwhile, when the RF broadcast signal is an analog broadcast signal, the tuner 110 converts the RF broadcast signal into an analog baseband video/audio signal (CVBS/SIF). In this manner, the tuner 110 may be a hybrid tuner capable of processing a digital broadcast signal and an analog broadcast signal.

The digital IF (DIF) signal output from the tuner 110 may be input to the demodulation unit 120, and the analog baseband video/audio signal (CVBS/SIF) output from the tuner 110 may be input to the controller 160. The tuner 120 may receive an RF broadcast signal of a single carrier according to an advanced television systems committee (ATSC) scheme or RF broadcast signals of a plurality of carriers according to a digital video broadcasting scheme.

Although a single tuner 110 is illustrated but the present inventive concept is not limited thereto and the video display device 100 may include a plurality of tuners, for example, first and second tuners. In this case, the first tuner may receive a first RF broadcast signal corresponding to a broadcast signal selected by a user and the second tuner may sequentially or periodically receive a second RF broadcast signal corresponding to a stored broadcast signal. The second tuner may convert the RF broadcast signal into a digital IF (DIF) signal or an analog baseband video/audio signal (CVBS/SIF), like the first tuner.

The demodulation unit 120 may receive the converted digital IF (DIF) signal from the tuner 110 and perform a demodulation operation thereon. When the digital IF signal (DIF) output from the tuner 110 is based on an ATSC scheme, the demodulation unit 120 may perform 8-vestigal side band (8-VSB) demodulation. 8-VSB demodulation is demodulation based on VSB of single carrier amplitude modulation using a national television system committee (NTSC) frequency band. Here, the demodulation unit 120 may perform channel decoding such as trellis decoding, deinterleaving, Reed-Solomon decoding, or the like. To this end, the demodulation unit 120 may include a trellis decoder, a deinterleaver, a Reed-Solomon decoder, and the like.

in another example, when the digital IF (DIF) signal output from the tuner 110 is based on a DVB scheme, the demodulation unit 120 performs coded orthogonal frequency division modulation (COFDMA) demodulation. Here, the demodulation unit 120 may perform channel decoding such as convolution decoding, deinterleaving, Reed-Solomon decoding, or the like. To this end, the demodulation unit 120 may include a convolution decoder, a deinterleaver, and a Reed-Solomon decoder, or the like.

The signal input unit 130 may be connected to an external device and perform a signal input and output operation, and to this end, the signal input unit 130 may include an A/V input/output unit and a wireless communication unit.

The A/V input/output unit may include an Ethernet terminal, a universal serial bus (USB) terminal, a composite video banking sync (CVBS) terminal, a component terminal, an S-video terminal (analog), a digital visual (DV) interface terminal, a high definition multimedia interface (HDMI) terminal, a mobile high-definition link (MHL) terminal, an RGB terminal, a D-SUB terminal, an IEEE 1394 terminal, an SPDIF terminal, a liquid HD terminal, and the like. A digital signal input through these terminals may be delivered to the controller 150. Here, an analog signal input through the CVBS terminal and the S-video terminal may be converted into a digital signal through an analog-digital conversion unit (not shown) and delivered to the controller 150.

The wireless communication unit may perform a wireless Internet access. For example, the wireless communication unit may perform a wireless Internet access by using a wireless LAN (WLAN), Wi-Fi, wireless broadband (Wibro), world interoperability for microwave access (Wimax), high speed downlink packet access (HSDPA), and the like. Also, the wireless communication unit may perform short-range wireless communication with a different electronic device. For example, the wireless communication unit may perform short-range wireless communication by using Bluetooth, radio frequency identification (RFID), infrared data association (IrDA), ultra wideband (UWB), ZigBee, or the like.

The signal input/output unit 130 may deliver a video signal, an audio signal, and a data signal provided from an external device such as a digital versatile disk (DVD) player, a blue-ray player, a game device, a camcorder, a computer (notebook computer), a portable device, a smartphone, and the like, to the controller 150. Also, the signal input/output unit 130 may deliver video signals, audio signals, and data signals of various media files stored in an external storage device such as a memory device, a hard disk, or the like, to the controller 150. Also, the signal input/output unit 130 may deliver a video signal, an audio signal, a data signal processed by the controller 150 to any other external device.

The signal input/output unit 130 may be connected to a set-top box, for example, a set-top box for an Internet protocol (TV), through at least one of the various terminals as mentioned above to perform a signal input and output operation. Also, the signal input/output unit 130 may deliver a video signal, an audio signal, and a data signal processed by the set-top box for an IPTV such that bi-directional communication is available, to the controller 150, and may deliver the signals processed by the controller 150 to the set-top box for an IPTV. Here, the IPTV may include an ADSL-TV, a VDSL-TV, an FTTH-TV, and the like, differentiated according to a transmission network.

A digital signal output from the demodulation unit 120 and the signal input/output unit 130 also may include a stream signal (TS). As mentioned above, the stream signal TS may be a signal obtained by multiplexing a video signal, an audio signal, and a data signal. For example, the stream signal TS may be an MPEG-2 TS (transport stream) in which a video signal of an MPEG-2 standard, an audio signal of dolby AC-3 standard, and the like, is multiplexed. Here, the MPEG-2 TS may include a 4-byte header and 184-byte payload.

The interface unit 140 may receive an input signal for power control, channel selection, screen setting, and the like, from the external input device 200, or may transmit a signal processed by the controller 160 to the external input device

200. The interface unit 140 and the external input device 200 may be connected in a wired manner or wirelessly.

A sensor unit may be provided as an example of the interface unit 140, and the sensor unit may be configured to sense an input signal from a remote controller.

A network interface unit (not shown) provides an interface for connecting the video display device 100 to a wired/wireless network including the Internet. The network interface unit (not shown) may include an Ethernet terminal, or the like, for a connection to a wired network, and the WLAN, Wi-Fi, Wibro, Wimax, HSDPA communication standard, and the like, may be used for a connection to a wireless network.

The network interface unit (not shown) may be connected to a predetermined Web page via a network. Namely, the network interface unit (not shown) may be connected to a predetermined Web page to transmit and receive data to and from a corresponding server. Besides, the network interface unit (not shown) may receive content or data provided by a content provider or a network operator. Namely, the network interface unit (not shown) may receive content such as movie, advertisement, game, VOD, broadcast signals, and the like, provided by a content provider or a network provider and information related thereto. Also, the network interface unit (not shown) may receive updated information or updated file of firmware provided by a network operator. Also, the network interface unit may transmit data to an Internet or content provider or a network operator.

Also, the network interface unit (not shown) may selectively receive a desired application among applications open to the public via a network.

The controller 150 may control a general operation of the video display device 100. For example, the controller 150 may control the tuner 110 to tune an RF broadcast signal corresponding to a channel selected by a user or a stored channel. Although not shown, the controller 150 may include a demultiplexing unit, a video processing unit, an audio processing unit, a data processing unit, an on-screen display (OSD) generating unit, and the like.

The controller 150 may demultiplex a stream signal TS, e.g., an MPEG-2 TS to separate it into a video signal, an audio signal, and a data signal.

The controller 150 may process the demultiplexed video signal, e.g., perform decoding on the demultiplexed video signal. In detail, the controller 150 may decode a coded video signal of the MPEG-2 standard by using an MPEG-2 decoder, and decode a coded video signal of the H.264 standard according to a digital multimedia broadcasting scheme or a DVB-H by using an H.264 decoder. Also, the controller 150 may process the video signal to adjust brightness, tint, color, and the like, of an image. The video signal processed by the controller 150 may be delivered to the display unit 170 or may be delivered to an external output device (not shown) through an external output terminal.

The controller 150 may process the demultiplexed audio signal. For example, the controller 150 may perform decoding on the demultiplexed audio signal. In detail, the controller 150 may decode the coded audio signal of the MPEG-2 standard by using an MPEG 2 decoder, may decode the coded audio signal of an MPEG 4 bit sliced arithmetic coding (BSAC) according to a DMB scheme by using an MPEG 4 decoder, and may decode the coded audio signal of the advanced audio codec (AAC) standard of MPEG 2 according to a satellite DMB scheme or DVB-H. Also, the controller 150 may process base, treble, volume control, and the like. The audio signal processed by the controller 150 may be delivered to an audio output unit 180, for example, a speaker, or may be delivered to an external output device.

The controller 150 may process an analog baseband video/audio signal (CVBS/SIF). Here, the analog baseband video/audio signal (CVBS/SIF) input to the controller 150 may be an analog baseband video/audio signal output from the tuner 110 or the signal input/output unit 130. The processed video signal may be displayed through the display unit 170, and the processed audio signal may b output through the audio output unit 180.

The controller 150 may process the demultiplexed data signal. For example, the controller 150 may perform decoding on the demultiplexed data signal. Here, the data signal may include electronic program guide (EPG) information including a start time, a terminate time, or the like, of a broadcast program aired in each channel. In an ATSC scheme, the EPG information may include ATSC-program and system information protocol (ATSC-PSIP), and in a DVB scheme, the EPG information may include DVB-service information (SI). The ATSC-PSIP information or the DVB-SI information may be included in a header (4 byte) of an MPEG-2 TS.

The controller 150 may perform a control operation to process OSD. In detail, the controller 150 may generate an OSD signal for displaying various types of information in a graphic or text form on the basis of at least one of a video signal and a data signal or an input signal received from the external input device 200. The OSD signal may include various types of data such as a user interface screen, a menu screen, a widget, an icon, and the like.

The memory 160 may store a program for signal processing or controlling of the controller 150, or may store a processed video signal, audio signal, and data signal. The memory 160 may include at least one of a flash memory, a hard disk type memory, a multimedia card micro type memory, a card type memory (e.g., an SD or XD memory), a random access memory (RAM), a static RAM (SRAM), a read-only memory (ROM), an electrically erasable programmable ROM (EEPROM), a programmable ROM (PROM), a magnetic memory, a magnetic disk, and an optical disk.

The display unit 170 may convert the video signal, the data signal, the OSD signal, and the like, processed by the controller 150 into RGB signals to output an image. The display unit 170 may be implemented in various forms such as a plasma display panel (PDP), a liquid crystal display (LCD), a thin film transistor-LCD (TFT-LCD), an organic light emitting diode (OLED) display, a flexible display, a three-dimensional (3D) display, an e-ink display, and the like. Also, the display unit 170 may be implemented as a touch screen to serve as an input device.

The audio output unit 180 may output an audio signal, for example, a stereo signal or a 5.1-channel signal, processed by the controller 150. The audio output unit 180 may be implemented as various types of speakers.

Meanwhile, an image capturing unit (not shown) for capturing an image of the user may be further provided. The image capturing unit (not shown) may be implemented as a single camera but the present inventive concept is not limited thereto and the image capturing unit may be implemented as a plurality of cameras. Image information captured by the image capturing unit (not shown) may be input to the controller 150.

Meanwhile, in order to sense a user gesture, as mentioned above, a sensing unit (not shown) including at least one of a touch sensor, a voice sensor, a position sensor, and an operating sensor may be further provided in the video display device. A signal sensed by the sensing unit (not shown) may be delivered to the controller 150 through the interface unit 140.

The controller 150 may sense a user gesture according to the image captured by the image capturing unit (not shown) or the signal sensed by the sensing unit (not shown), separately, or by combining these signals.

A power supply unit (not shown) supplies power to the video display device 100. In particular, the power supply unit (not shown) may supply power to the controller 150 that may be implemented in the form of a system on chip (SOC), the display unit 170 for displaying an image, and the audio output unit 180 for outputting audio.

To this end, the power supply unit (not shown) may include a converter (not shown) for converting alternating current (AC) power into direct current (DC) power. Meanwhile, for example, in a case in which the display unit 170 is implemented as a liquid crystal panel having a plurality of backlight lamps, the power supply unit (not shown) may further include an inverter (not shown) that may be able to perform a pulse width modulation (PWM) operation for the purpose of varying luminance or dimming driving.

The external input device 200 may be connected to the interface unit 140 in a wired manner or wirelessly, and may transmit an input signal generated according to a user input to the interface unit 140. The external input device 200 may include a remote control device, a mouse, a keyboard, and the like. The remote control device may transmit an input signal to the interface unit 140 through Bluetooth, RF communication, infrared communication, ultra-wideband (UWB), Zig-Bee, and the like. The remote control device may be implemented as a spatial remote control device. The spatial remote control device may generate an input signal by sensing an operation of a body in a space.

The video display device 100 may be implemented as a fixed type digital broadcast receiver capable of receiving at least one of an ATSC-type (8-VSB-type) digital broadcast, a DVB-T type (COFDM-type) digital broadcast, an ISDB-T type (BST-OFDM-type) digital broadcast, and the like. Also, the video display device 100 may be implemented as a mobile digital broadcast receiver capable of receiving at least one of a terrestrial digital multimedia broadcasting-type digital broadcast, a satellite DMB-type digital broadcast, an ATSC-M/H type digital broadcast, a DVB-H type (COFDM type) digital broadcast, a media forward link only type digital broadcast, and the like. Also, the video display device 100 may be implemented as a digital broadcast receiver for a cable, satellite communication, and an IPTV.

The video display device described above may also be applied to a mobile terminal. The mobile terminal may include a portable phone, a smartphone, a notebook computer, a laptop computer, a digital broadcasting terminal, a personal digital assistant (PDA), a portable multimedia player (PMP), a navigation device, a slate PC, a tablet PC, an ultrabook, and the like.

When the video display device is used as a mobile terminal, a wireless communication unit may be added.

The wireless communication unit may include one or more modules allowing for wireless communication between the mobile terminal 100 and a wireless communication system or between the mobile terminal and a network in which the mobile terminal is located. For example, the wireless communication unit may include at least one of a broadcast receiving module, a mobile communication module, a wireless Internet module, a short-range communication module, and a location information module.

The broadcast receiving module may receive broadcast signals and/or broadcast associated information from a broadcast management server via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module may be configured to receive digital broadcast signals by using a digital broadcast system such as multimedia broadcasting-terrestrial (DMB-T), digital multimedia broadcasting-satellite (DMB-S), media forward link only (MediaFLO®), digital video broadcast-handheld (DVB-H), DVB-convergence of broadcasting and mobile service (CBMS), open mobile alliance-broadcast (OMA-BCAST), China multimedia mobile broadcasting (CMMB), mobile broadcasting business management system (MBBMS), integrated services digital broadcast-terrestrial (ISDB-T), and the like. The broadcast receiving module 111 may be configured to be suitable for any other broadcast system that provides a broadcast signal as well as the above-mentioned digital broadcast systems.

Broadcast signals and/or broadcast-associated information received via the broadcast receiving module may be stored in a memory.

The mobile communication module transmits and/or receives radio signals to and/or from at least one of a base station, an external terminal, and a server in a mobile communication network. Such radio signals may include an audio call signal, a video call signal or various types of data according to text and/or multimedia message transmission and/or reception.

The mobile communication module implements a video call mode and an audio call mode. The video call mode refers to a state in which a user performs call communication while viewing an image of a counterpart, and the audio call mode refers to a state in which the user performs call communication without viewing an image of a counterpart. In order to implement the video call mode and an audio call mode, the mobile communication module is formed to transmit and receive at least one of a sound and an image.

The wireless Internet module supports wireless Internet access for the mobile terminal. This module may be internally or externally coupled to the terminal. The wireless Internet access technique implemented may include a WLAN (Wireless LAN), (Wi-Fi) direct, digital living network alliance (DLNA), Wibro (Wireless broadband), Wimax (World Interoperability for Microwave Access), HSDPA (High Speed Downlink Packet Access), GSM, CDMA, WCDMA, LTE (Long Term Evolution), or the like.

The short-range communication module is a module for supporting short range communications. As the short-range communication technology, Bluetooth™, Radio Frequency IDentification (RFID), Infrared Data Association (IrDA), Ultra-WideBand (UWB), ZigBee™, Wi-Fi direct, and the like, may be used.

The location information module is a module for checking or acquiring a location of the mobile terminal. A typical example of the location information module is a GPS (Global Positioning System) or a WiFi (Wireless Fidelity) module.

Meanwhile, when the display unit 170 and a sensor (referred to as a 'touch sensor', hereinafter) for detecting a touch operation are overlaid in a layered manner to form a touch screen, the display unit 170 may function as both an input device and an output device. The touch sensor may have a form of a touch film, a touch sheet, a touch pad, and the like.

The touch sensor may be configured to convert changes of pressure applied to a specific part of the display unit 170, or convert capacitance occurring at a specific part of the display unit 170, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller. Accordingly, the controller may sense which region of the display unit 170 has been touched.

FIG. 2 is a conceptual view illustrating an interaction between the video display device 100 related to the present disclosure and an external input device. Here, a TV receiver is illustrated as an example of the video display device 100 and a remote controller is illustrated as an example of an external input device 200.

The external input device 200 may transmit a signal to or receive a signal from the video display device 100 according to an RF communication standard. A control menu may be displayed on the screen of the video display device 100 according to a control signal from the external input device 200. The external input device 200 may include a plurality of buttons and generate an external input signal according to a user's manipulation of buttons.

Also, the video display device according to an exemplary embodiment of the present disclosure may further include a wireless communication unit 190 performing wireless communication with an external device 900. Here, the external device 900 may correspond to an electronic device disposed together in an environment (for example, a house) in which the video display device is disposed, namely, a different electronic device within a preset distance from the video display device or an electronic device to which the substantially same user information has been input. Also, without being limited thereto, an electronic device that moves according to a user setting may also correspond to the external device 900. Here, the external device 9000 may be any device as long as it has a communication function to perform wireless communication with the video display device 100, and a type thereof is not limited. For example, the external device may be a mobile terminal, a notebook computer, an air-conditioner, an automobile, and the like.

The video display device according to an exemplary embodiment of the present disclosure selectively outputs advertisement data among received broadcast signals. Advertisement data output from the video display device may be classified based on a reference such as a program advertisement, a spot advertisement, a local advertisement, a network advertisement. The program advertisement refers to an advertisement including an advertisement message inserted into a program by an advertiser who participates as a sponsor of the program. The spot advertisement refers to an advertisement inserted into a program, and an interval in a program is called a station brake. A local advertisement is an advertisement using a local broadcasting station, and a network advertisement refers to an advertisement provided for the whole country by a broadcasting station which has a nationwide broadcast network.

Also, advertisement may also be classified as a public service advertisement for the purpose of the public benefit provided by an enterprise or an organization, a corporate advertisement as an intuitional advertisement intended to provide a favorable attitude or good image of an enterprise for consumers, a goods/article advertisement for the purpose of selling products or goods (or articles).

Namely, the video display device receives advertisement data including preset content and provides the advertisement data to a user at a preset time. However, the video display device according to an exemplary embodiment of the present disclosure outputs particular content of an optimized advertisement to a user based on information received from other electronic device of the user. Hereinafter, a control method of providing optimized content to a user will be described in detail.

Figure 3A:
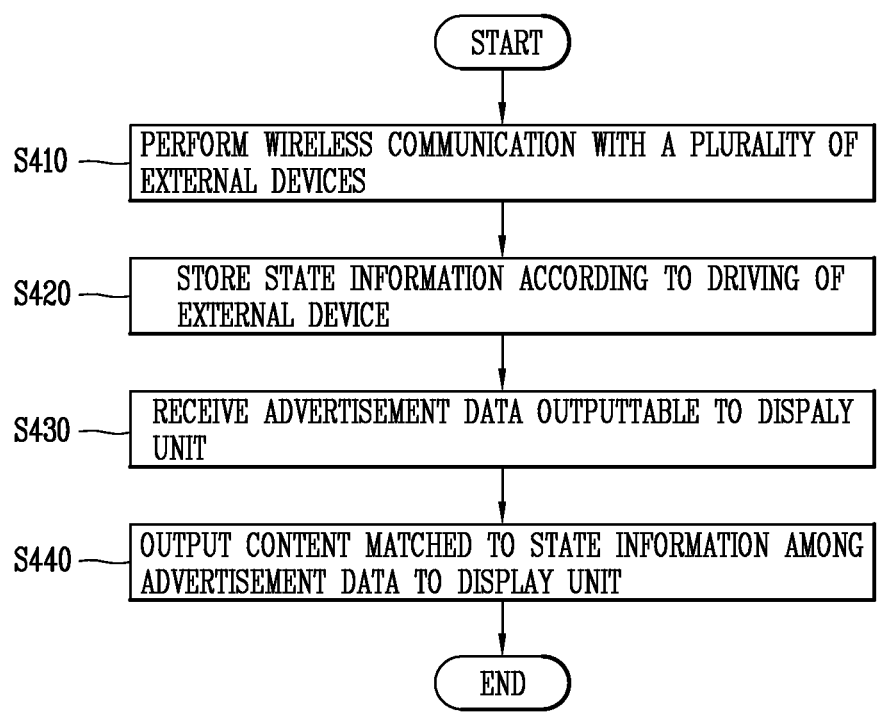
FIG. 3A is a conceptual view illustrating a control method of a video display device according to an exemplary embodiment of the present disclosure.

FIG. 3A is a conceptual view illustrating a control method of a video display device according to an exemplary embodiment of the present disclosure, and FIG. 3B is a flow chart illustrating the control method of FIG. 3A according to an exemplary embodiment of the present disclosure. The video display device according to an exemplary embodiment of the present disclosure performs wireless communication with the external device 900 through the wireless communication unit 190. The wireless communication unit 190 performs wireless communication with the external device 900 based on a user setting in step S410.

The controller 150 controls the wireless communication unit 190 to receive state information from the external device 900. For example, the controller 150 may control the wireless communication unit 190 to receive updated information of the external device 900 according to a preset period.

The memory 160 stores state information according to driving of the external device 900. Here, the state information may correspond to unique information regarding the external device 900 or information regarding a driven state when the external device 900 is driven. Referring to FIG. 3B, the external device 900 may correspond to an automobile. In this case, the state information may include information regarding the automobile itself, and the information regarding the automobile itself may be a type of the automobile and information related to the automobile type, a driving time of the automobile, and the like. Also, the information related to driving of the automobile may be information regarding refueling required when the automobile is driven, running route information of the vehicle, information regarding an additional function installed in the automobile, and the like. The state information related to driving of the external device 900 may be information related to major driving characteristics of the external device 900. Namely, in the case of the automobile, the state information related to driving of the external device 900 may be information regarding running of the automobile. However, types of state information received by the user may be additionally set.

The controller 150 may control the memory 160 to store the received state information for a preset period of time. Also, the memory may store the received state information by tagging to a date on which the state information is received.

Referring to FIG. 3B, first state information D1 is received by the video display device 100, and the memory 160 of the video display device 100 stores the first state information D1.

The tuner 110 receives advertisement data outputtable to the display unit 170 in real time in step S430. Referring to FIG. 3B, the first advertisement data A may include first and second content items a1 and a2. For example, the first advertisement data A may be an advertisement that a producer who produces fuel as a product to be injected into an automobile promotes fuel fitting to various vehicles to consumers. The first content item a1 may be an advertisement related to diesel applied to a general medium sized car, and the second content item a2 may be an advertisement related to charging of an electric vehicle applied to an electric vehicle.

Namely, the advertisement data received as a broadcast signal through the tuner 110 includes a plurality of content items and is received from an advertiser. The controller 150 may receive the advertisement data A in real time or may control the memory 160 to store the advertisement data A received in advance.

The controller 150 may select content matched to the first state information D1 among the advertisement data, and controls the display unit 170 to output only the selected content. For example, when the advertisement data corresponds to a spot advertisement, the controller 150 may receives the first and second content items a1 and a2 and, before providing the advertisement data, the controller 150 compares the first and second content items a1 and a2 with the first state information D1 before providing the advertisement data.

The controller 150 selects a content item matched to the first state information D1, among the first and second content items a1 and a2. In a case in which the advertisement data is an advertisement for promoting goods (or a product), the controller 150 may select a content item including goods (or product) applied to the first state information D1.

For example, in a case in which the first state information D1 includes information regarding the current amount of residual diesel of the automobile, the controller 150 selects the first content item a1 including advertisement information related to diesel. Accordingly, the display unit 170 outputs screen information 500 corresponding to the first content item a1 of the advertisement data. The screen information 500 may include an image for injecting diesel, an image for promoting high quality diesel, and the like.

In the video display device 100 according to an exemplary embodiment of the present disclosure, the advertisement data may include advertisement content items of different versions, and an advertisement content item having high relevancy with goods (or product) which is likely to be actually used by the user by using state information received from the external device 900.

Even in a case in which the display unit 170 of the video display device 100 is maintained in a deactivated state, the controller 150 may control the wireless communication unit 190 to receive state information from the external device 900.

Also, the advertisement data may include information regarding a preset output time at which the advertisement data is to be output. Accordingly, the controller 150 may compare state information received at a time close to the output time with the advertisement data preferentially.

Accordingly, since the user is provided with information regarding substantially required goods (or product), a purchase possibility of the goods included in the advertisement content can be increased, and thus, an advertisement effect can be maximized. Also, since the user is provided with an advertisement of goods (or product) which is substantially highly associated with driving of the external device 900, the goods (or product) expected to be required for the user can be aroused.

FIG. 4 is a flow chart illustrating a control method according to another exemplary embodiment of the present disclosure. The wireless communication unit 110 performs wireless communication with a plurality of external devices in step S411. The controller 150 controls the memory 160 to store state information of the external devices received through the wireless communication unit 110 in step S421.

The controller 150 transmits the state information to a preset particular server in step S431. The controller 150 may control the wireless communication unit 110 to transmit the state information to the sever when a preset condition is met. For example, the controller 150 may control the wireless communication unit to transmit the state information which has been stored in the memory 160 when the display unit 170 is activated, or transmit the state information to the server in real time when an advertisement signal scheduled to be output is received.

A content item matched to the state information, among a plurality of content items included in the advertisement data, is received in step S441. Here, the content item may include information output as an advertisement to the video display device 100 and there is no limitation in a type of information or a target to be advertised. The content item may correspond to information advertising targets of different categories, information provided by different advertisers, information related to products corresponding to the same category, and the like.

A method for selecting the matched content item is substantially identical to the step S440 of selecting a content item matched to the state information among the advertisement data. Thus, a description of selectively receiving the matched content item in a server will replace the description of FIG. 3A.

The controller 150 controls the display unit 170 to output the received content in step S451. There is no limitation in the number of content items which are received and output. For example, in a case in which a plurality of content items are received, the controller 150 may control the display unit 170 to sequentially output the plurality of content items or output divided screen information of the display unit 170.

Accordingly, before receiving every content provided in the server, the user may be provided with a content item matched to the state information of the external device. Namely, the user may be provided with a content item properly reflecting the user demand, and since an advertisement content item desired to be output is not required to be received in advance, driving may be simply performed.

The video display device 100 analyzes various state information received from the external device and provides a selected content item to the user. Hereinafter, a control method of selectively providing a content item included in advertisement data according to various exemplary embodiments of the present disclosure will be described.

A control method of providing advertisement data using state information based on data stored by the user will be described with reference to FIG. 5A. The wireless communication unit 190 according to the present exemplary embodiment receives second state information D2 from a mobile terminal.

The second state information D2 may include data input by the user. Namely, the state information according to the present exemplary embodiment may be differentiated from a driving state of the mobile terminal and may correspond to data stored according to a control command of the user. For example, the controller 150 may receive data stored by the user or transmitted to a different device according to a preset application of the mobile terminal and utilize the received data as state information. For example, the application may correspond to a memory application, a message application, a gallery application storing image information, and the like. However, the present disclosure is not limited thereto and the application may set be based on a user.

Referring to FIG. 5A, the second state information D2 correspond to text (detergent purchase) stored in a storage unit of the mobile terminal by the user, while the memo application of the mobile terminal is being executed.

Meanwhile, the tuner 110 transmits second advertisement data C formed by an enterprise that produces cleaning articles. For example, the second advertisement data C may include a first content item c1 promoting rag (or wiper) and a second content item c2 promoting a detergent.

Accordingly, when the second advertisement data C is received by the tuner 110, the controller 150 may compare the second advertisement data C with the second state information D2, and select the second content item c2 matched to the second state information D2.

Accordingly, the controller 150 controls the display unit 170 to output first screen information 510 related to the second content item c2 of the second advertisement data.

Figure 5B:
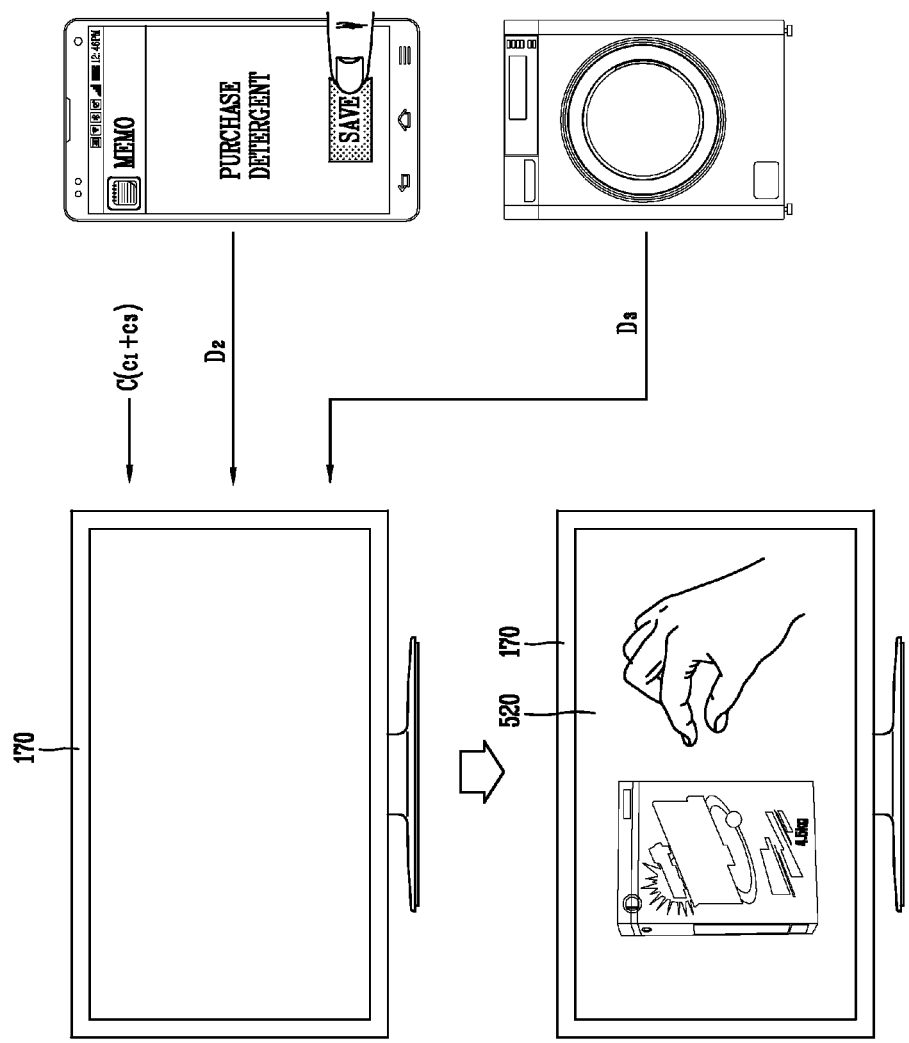

A control method of providing advertisement data based on state information received from a plurality of external devices will be described with reference to FIG. 5B. The wireless communication unit 190 receives second and third state information from different external devices. The second state information D2 is substantially identical to the second state information D2 of FIG. 5A, so a detailed description thereof will be replaced by the description of FIG. 5A.

Meanwhile, the third state information D3 corresponds to information received from a washing machine. For example, the third state information D3 may include information related to a type of the washing machine (drum type), a type of a detergent used in the washing machine, a time during which the washing machine is driven, a function of the driven washing machine, and the like.

The controller 150 compares the received third advertisement data C with the second and third state information. For example, the controller 150 selects a content item related to the second and third state information D2 and D3, among the first and third content items c1 and c3.

For example, the first content item c1 may be an advertisement content item including a detergent used in an agitator-type washing machine using an agitator-type vertical-directional water tank, and the third content c3 may be an advertisement content item including a detergent used in a drum-type washing machine using a horizontal-directional water tank. The detergents included in the first and third content items c1 and c3 may be products which are produced by the substantially same producer (or manufacturer), have the same category and function, and applied to different types.

The controller 150 selects the third content item c3 of the third advertisement data C based on the third state information D3 including information regarding the drum-type washing machine. Also, the display unit 170 outputs second screen information 420 corresponding to the third content item c3. The second screen information 420 may include advertisement information formed by an image of a detergent used in a drum-type washing machine, usage descriptions, and the like.

According to the present exemplary embodiment, state information received from a plurality of external devices may be synthesized (i.e., put together or combined) to select a content item based on the combined state information. Accordingly, advertisement information regarding an article more appropriate for driving of each external device may be provided to the user.

In the above description, the content item is selected by using the state information received from two external devices, but there is no limitation in the number of received state information. Also, the controller 150 may analyze categories of the received state information, and combine related state information.

A control method of providing an advertisement by using a camera installed in the video display device 100 will be described with reference to FIG. 5C. The video display device 100 may further include a camera 131 formed to image an external environment. For example, the camera 131 may be disposed to be adjacent to the display unit 170.

The controller 150 controls the camera 131 to capture an image of a surrounding environment of the video display device 100, and controls the memory 160 to store the captured image. The camera 131 is controlled to capture an image of the surrounding environment according to a preset control command. For example, in a case in which the display unit 170 is activated, the controller 150 may activate the camera 131 or may control the camera 131 to capture images of the surrounding environment at preset time intervals (for example, a day, a week, and the like).

A surrounding environment of the video display device 100 may be imaged by the camera 131. For example, an other external device, furniture, the user in a space in which the video display device 100 is disposed, and a pet moving in the space, and the like, may be imaged. The controller 150 may generate external information by the image. For example, the controller 150 may generate external information by analyzing a type of furniture, a disposition of the furniture, and a color of the furniture included in the external environment or a type of a pet included in the external environment according to images, or generates information regarding a driving state of the external device that wirelessly communicates with the wireless communication unit 190 by using the images.

Meanwhile, the controller 150 receives fourth advertisement data E. For example, the fourth advertisement data E may correspond to advertisement data of a producer that produces feedstuff (or food) of pets. For example, the fourth advertisement data E includes first and second content items e1 and e2 of different versions. For example, the first content item e1 is an advertisement content item including information regarding dog food and the second content item e2 may be an advertisement content item including information regarding cat food.

The controller 150 may form external information indicating that a dog exists in the external environment based on an image captured by the camera 131. Namely, the controller 150 compares external information including information regarding the dog and the fourth advertisement data E. The controller 150 selects the second content item e2 including information regarding dog food matched to the information regarding dog included in the external information in the fourth advertisement data E.

Accordingly, the controller 150 controls the display unit 170 to output third screen information 530 corresponding to the second content e2. Namely, the controller 150 may use the image captured by the camera 151 as a basis for selecting the content item included in the advertisement data.

Accordingly, the controller 150 may collect information which is unavailable for wireless communication but is related to the user through the camera 131, as well as through an external device available for wireless communication. Thus, based on the information collected by the camera, an advertisement content item more appropriate for the user can be provided.

A control method of outputting an advertisement screen by using an image captured by the camera will be described with reference to FIG. 5D.

Referring to (a) of FIG. 5D, the camera 131 images an external environment. The controller 150 may collect information regarding an external device, furniture, and the like, included in the external environment through the image of the external environment. For example, the controller 150 may generate information regarding a color of a table included in the external environment, as the external information.

For example, the tuner 110 receives fifth advertisement data H related to a window frame. The fifth advertisement data H may include a plurality of content items including window frame images formed in different colors. The controller 150 selects a content item related to the image of the external environment, from among the plurality of content items. For example, the controller 150 may select a content item including a window frame image having a color similar to a color of the table.

Accordingly, the display unit 170 may output fourth screen information 540 according to the selected content.

Alternatively, the controller 150 may process the received fifth advertisement data H based on the image and output the processed data to the display unit 170. For example, the controller 150 may generate an advertisement image processed such that the color of the window frame image included in the fifth advertisement data H corresponds to the color of the table.

Meanwhile, referring to (a) and (b) of FIG. 5D, the controller 150 may generate fifth screen information 550 combining the image of the external environment and the fifth advertisement data H. The fifth screen information 550 may correspond to a processed image combining the window frame image included in the fifth advertisement data H to the image of the external environment captured by the camera 131.

In this case, the fifth advertisement data H may provide only an image of a target to be advertised. The controller 150 may change a size, a color, and the like, of the image and apply the same to the image of the external environment.

FIGS. 5E and 5F are conceptual views illustrating a control method of sensing the number of viewers who are to be provided with screen information output on the display unit and providing content. FIG. 5E illustrates a case in which two viewers in front of the display unit are sensed by the camera 131, and FIG. 5F illustrates a case in which five viewers in front of the display unit are sensed by the camera 131. However, the number of viewers is not limited thereto.

The controller 150 receives seventh state information D7 receives seventh state information D7 from an external device (refrigerator) and, here, the seventh state information D7 may include information regarding one beverage (type and number of beverage) stored in the refrigerator.

The controller 150 controls the display unit 170 to selectively output a content item corresponding to information regarding the two viewers, among a plurality of content items. For example, the screen information related to the selected content item may include an image in which two people each drink one beverage pleasantly.

Meanwhile, referring to FIG. 5F, when five viewers are detected to be in front of the video display device, the controller 150 determines it as a large number of viewers. Thus, the controller 150 selects a content item including screen information in which a plurality of people are present. For example, the screen information may include an image in which a large number of people run at a single beverage bottle in a hot summer day.

Viewers who view the advertisement content item in which multiple people run may experience thirst and associate the number of beverages stored in a refrigerator. Also, the viewers may sense those who are viewing the advertisement content item together nearby and feel like purchasing, enhancing an advertisement effect.

Namely, even when state information including substantially same information is received from the substantially same external device, the controller 150 may provide different content items according to viewers who are sensed by the camera 131.

Namely, the user may be provided with an image in which a target to be advertised is applied to the surrounding environment of the actual user. Accordingly, the advertiser may promote user's purchasing.

FIGS. 6A through 6D are conceptual views illustrating a control method of outputting advertisement content based on additional information of an external device.

Figure 6A:
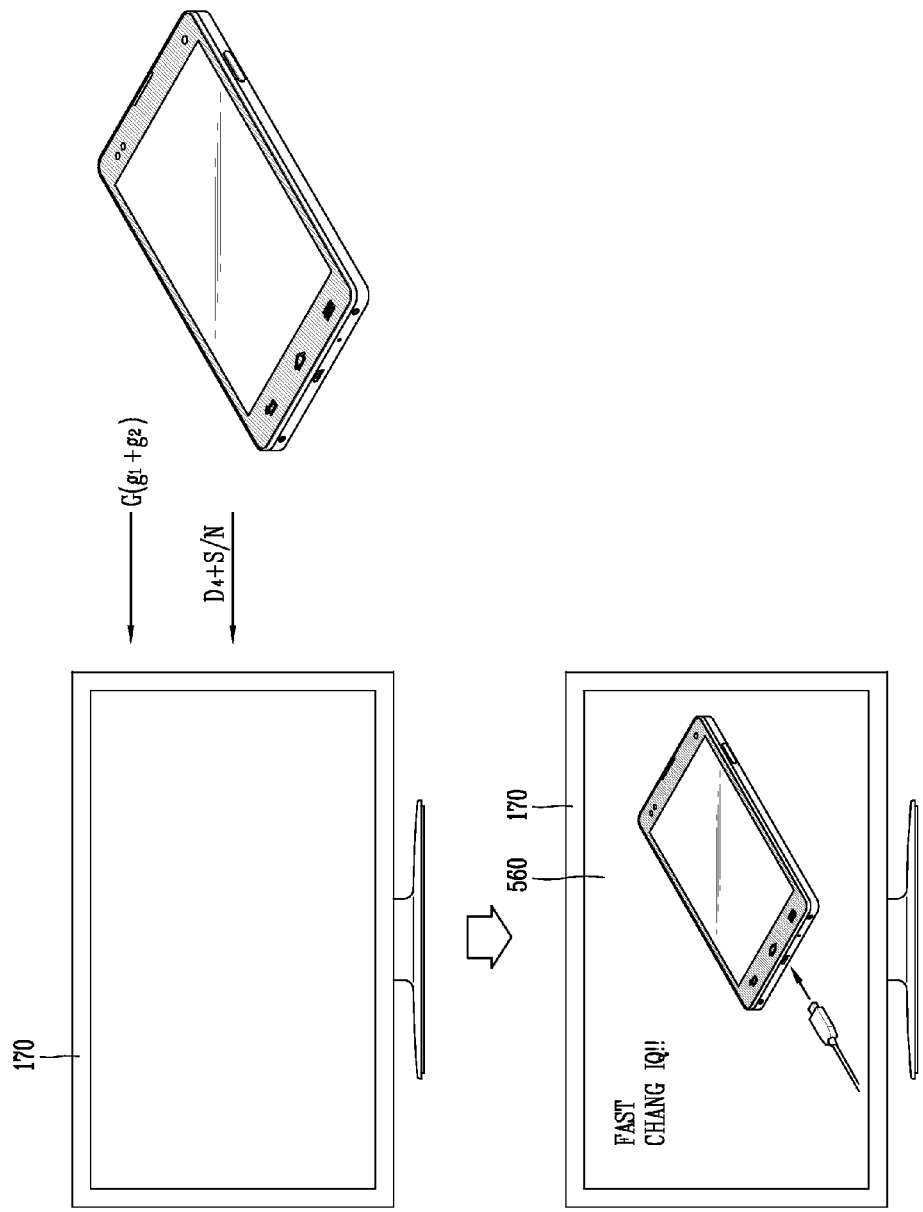

A control method of providing screen information including an image of an actual external device will be described with reference to FIG. 6A. The tuner 110 receives sixth advertisement data G. For example, the sixth advertisement data G may correspond to a cable connected to a mobile terminal. The sixth advertisement data G may include first and second content items g1 and g2 including information regarding different types of cables in which connection portions connected to the mobile terminal are different.

Also, the wireless communication unit 190 may receive additional information of the external device together with the fourth state information D4. The additional information according to the present exemplary embodiment may correspond to a serial number of the external device. The serial number corresponds to a serial number attached to mass-produced hardware or computer software. Namely, based on the serial number, specific characteristics unique to an external device, as well as a type of the external device, may be extracted.

Here, however, the additional information is not limited to the serial number and may correspond to data including information such as operational characteristics of the external device, an outer design of the external device, and the like.

For example, when the additional information corresponding to the serial number is received, the controller 150 may search for specific characteristics regarding the additional information through a server.

The controller 150 selects a content item including information of the cable that may be applicable to the external device by using the additional information. The controller 150 may control the display unit 170 to output screen information corresponding to the selected content.

Meanwhile, the controller 150 may control the display unit 170 to output sixth screen information 560 generated by combining an image of the external device searched based on the additional information and the content item. Referring to FIG. 6A, the sixth screen information 560 may include an image of a mobile terminal based on the additional information and an image of a cable that can be connected to the mobile terminal. The sixth screen information 560 may include an image in which an external device of the user and a target intended to be advertised are driven together.

Accordingly, the user may check the device that the user uses and the actually driven product. Accordingly, an effect of giving a demonstration of a product to the user can be obtained and the user's purchasing can be increased.

Figure 6B:
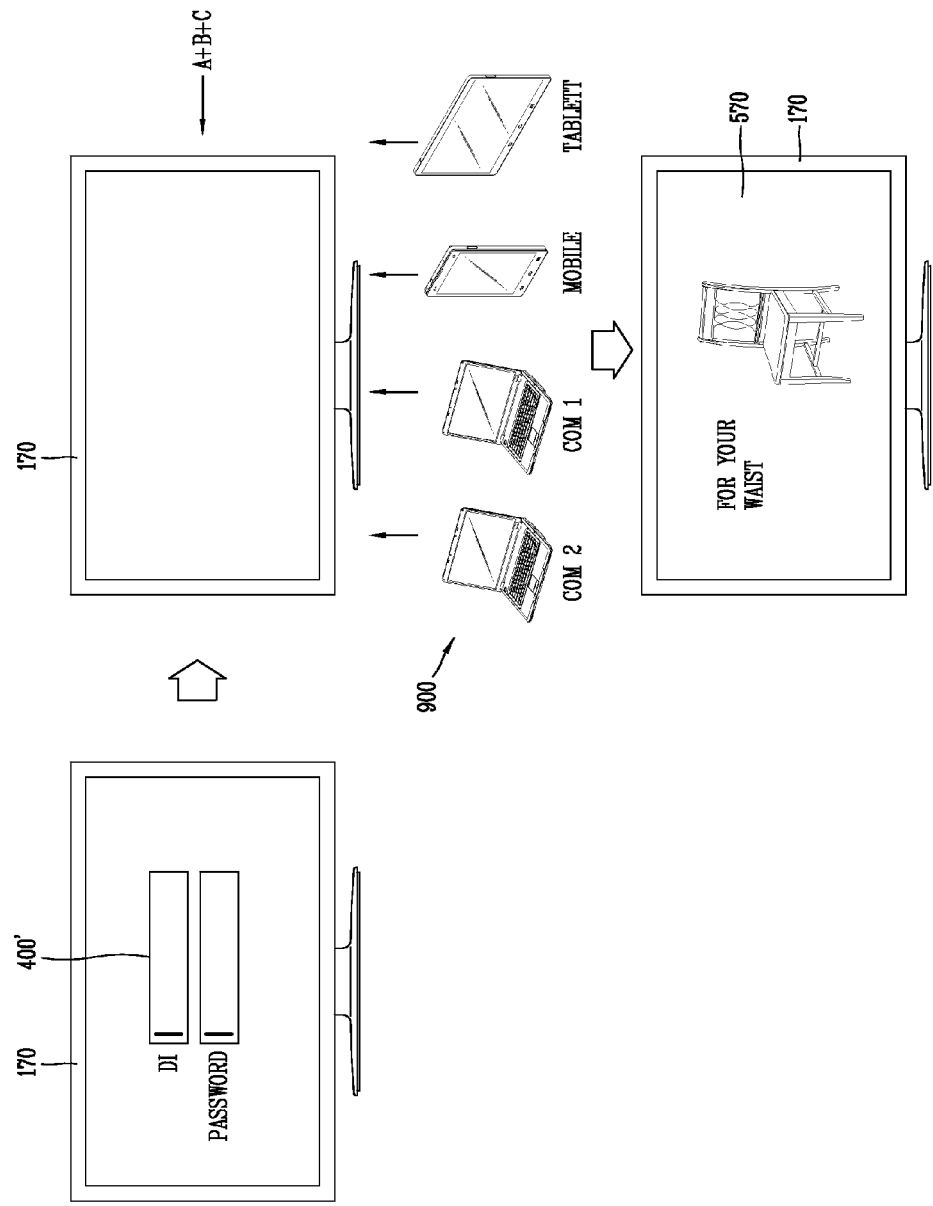

A control method of providing advertisement data by using state information received together with additional information according to another exemplary embodiment of the present disclosure will be described with reference to FIG. 6B. Additional information according to the present exemplary embodiment may correspond to unique information of the user. When the video display device 100 is activated, the controller 150 controls the display unit 170 to output a log-in page 400' for inputting unique information of the user. Also, the user may activate the external device by using the unique information when using the external device.

According to an exemplary embodiment of the present disclosure, the tuner 110 receives a plurality of advertisement data A, B, and C. In this case, the advertiser may transmit a broadcast signal such that only one among a plurality of advertisement data advertising different targets is selectively output. However, the present disclosure is not limited thereto and a plurality of advertisement content items forming single advertisement data may be received.

In a case in which the state information received from the external device includes the unique information, the controller 150 may select one among the plurality of advertisement data A, B, and C based on the state information. Namely, in a case in which the external device is activated by the substantially same unique information, the controller 150 receives state information according to driving of the external device. In a case in which the unique information input to the video display device 100 and the unique information input to the external device are different, the controller 150 may cut off receiving of the state information or may receive information indicating that the input unique information is different from the unique information.

For example, the controller 150 generates a driving state according to searching of the substantially same target by the external device activated by the substantially same unique information, storing of an image including the target, storing of information including the target, and the like, as state information. Accordingly, the controller 150 may select advertisement data advertising the target related to the state information.

For example, in a state in which unique information is input to a plurality of external devices so the external devices are activated, when a chair is searched through a server by a first computer COM 1 and text of chair purchase is stored by the mobile terminal MOBILE, the controller 150 receives state information including information regarding a chair from the first computer and the mobile terminal. Alternatively, the controller 150 collects various state information of the plurality of external devices and forms repeated information as state information for selecting the advertisement data. The controller 150 selects the advertisement data including information regarding the chair, and controls the display unit 170 to output seventh screen information 570 corresponding to the advertisement data.

According to the present exemplary embodiment, the controller 150 may analyze a plurality of state information received from different external devices, and select advertisement data or content to be provided to the video display device through substantially repeated information.

Namely, according to driving of a plurality of external devices used by the substantially same user, user's need is recognized and advertisement data close to the user's need can be provided.

A control method of providing advertisement data promoting goods (or product) of the same category as that of an external device will be described with reference to FIG. 6C.

The tuner 110 receives second advertisement data B related to an enterprise. The second advertisement data B may include an advertisement regarding a product produced or manufactured by an enterprise and an enterprise advertisement for promoting an enterprise image. For example, the second advertisement data B may include a basic content item b1 corresponding to an enterprise advertisement, a second content item b2 regarding an automobile produced by the enterprise, and a first content item b1 regarding an additional device (for example, a navigation device, a black box, etc.) that may be installed in an automobile.

The controller 150 receives fifth state information D5 from an external device. Based on the fifth state information D5, the controller 150 selects a content item to be output to the video display device 100. For example, in a case in which information regarding a fault is included in the fifth state information D5 by a preset number of times or greater, the controller 150 may select the second content b2 including information regarding the external device itself, namely, the automobile.

However, the fifth state information D5 is not limited thereto. For example, the fifth state information D5 may include a purchase date of the automobile or a degree to which the automobile has been used. Or, there is no information related to the additional device in the fifth state information D5, or in a case in which the additional device is installed in the automobile, there is no usage record of the additional device.

Namely, based on state information received from the external device, the controller 150 may selectively output an advertisement content item including information of the external device, as well as a product (or goods) required for using the external device. Accordingly, user's purchasing toward an external device itself can be increased.

A control method of outputting an advertisement content item based on information of a target stored in a refrigerator in a case in which the external device corresponds to a refrigerator according to an exemplary embodiment of the present disclosure will be described with reference to FIG. 6D. For example, one bottle of beverage is stored in the refrigerator and the controller 150 controls the wireless communication unit 190 to receive seventh state information D7 of the refrigerator indicating that the one bottle of beverage is stored.

For example, the seventh state information may be sub-information of the state information received from the external device. For example, the refrigerator may generate information regarding categories of a plurality of storage targets stored in the refrigerator, states (expiration date, whether the storage targets have been changed, freshness, etc.) of the storage targets, storage information (date on which the storage targets were stored), the number of different targets corresponding to the same category, etc.), goods information of the targets (manufacturer, rival company of the manufacturer, a manufacture area, a purchase area of goods, etc.), as sub-information. The controller 150 receives at least a portion of the sub-information.

Based on the information regarding the number of the targets included in the sub-information, the controller 150 may select the advertisement content item. The controller 150 may select a content item reflecting the number of stored targets from among the advertisement data advertising the targets stored in the refrigerator.

Referring to the drawing, the content item may correspond to a content item including screen information expressing a refrigerator storing one beverage and a refrigerator storing a large amount of beverages together. Also, in the case of screen information including the refrigerator storing one beverage, it may include an effect showing sadness of a human being or a feeling of thirst.

Accordingly, the user may recollect a state in which the corresponding target is stored in the refrigerator and may feel like purchasing the target. Thus, the advertisement effect can be maximized.

Figure 7:
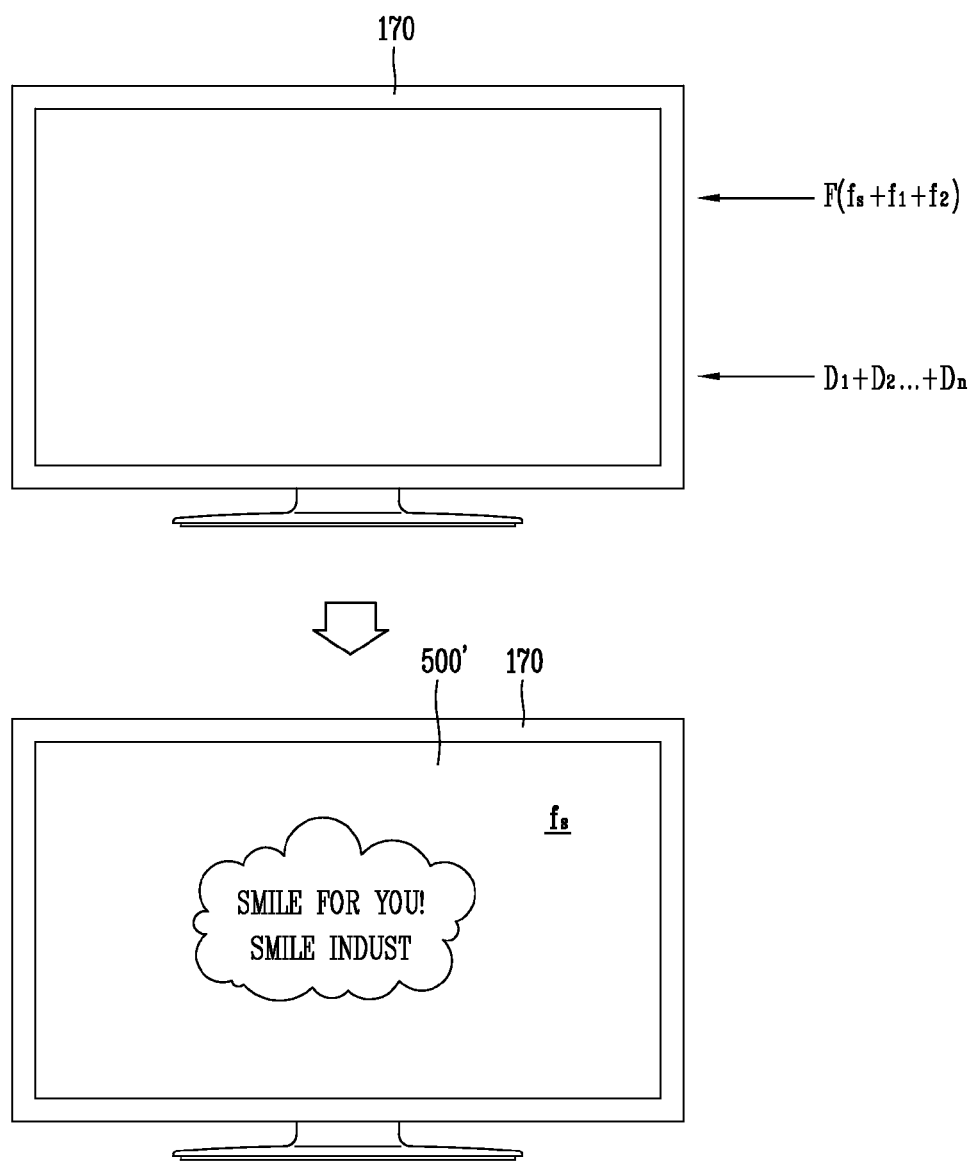
FIG. 7 is a conceptual view illustrating a control method of outputting basic content.

FIG. 7 is a conceptual view illustrating a control method of outputting basic content. While the tuner 110 is receiving a broadcast signal including fifth advertisement data F in real time, state information D1, D2, . . . , Dn of external devices are received through the wireless communication unit 190. For example, the fifth advertisement data F may include first and second content items f1 and f2 related to the product (or goods) and a basic content item fs of the fifth advertisement data F.

When the fifth advertisement data F is received, the controller 150 compares the fifth advertisement data F with the stored state information D1, D2, . . . , Dn of the external devices. When an advertisement target of the first and second content items f1 and f2 is not matched to the state information D1, D2, . . . , Dn, namely, when the advertisement target is not related to the state information D1, D2, . . . , Dn, the controller 150 selects the basic content item fs.

Namely, when the collected state information of the external device is not related to the target intended to be advertised, the controller 150 controls the display unit 170 to output a basic advertisement screen 500' corresponding to the basic content item fs.

Here, the basic content item fs may correspond to an enterprise advertisement of an enterprise that produces the target, but the present disclosure is not limited thereto. For example, the basic content item fs may correspond to an advertisement content item of a particular target designated by the advertiser.

According to the present exemplary embodiment, in a case in which a content item related to an external device of the user is not included in a plurality of content items received to be output at the current point in time, the controller 150 controls the display unit 170 to selectively provide the preset basic content item.

Figure 8:
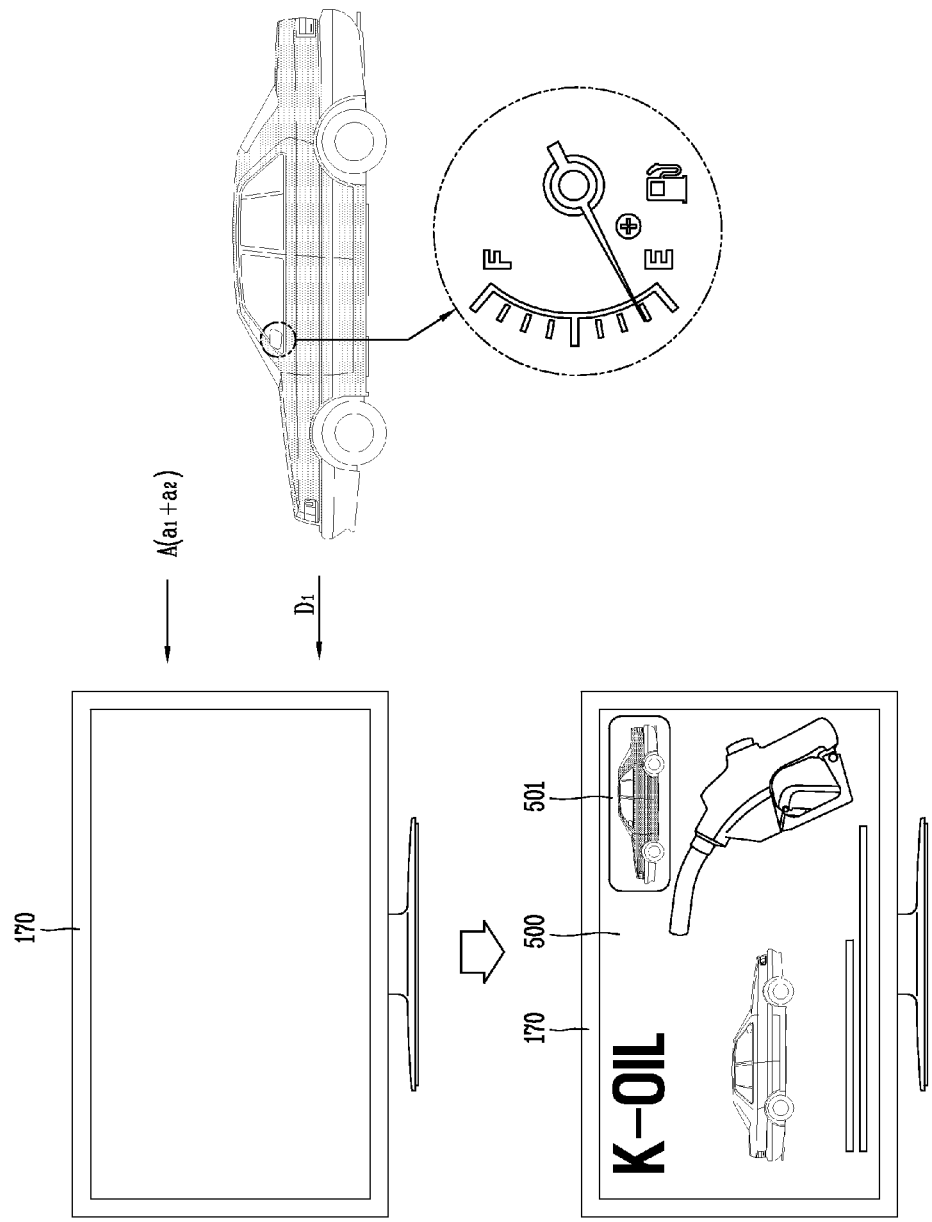
FIG. 8 is a conceptual view illustrating a control method of displaying an external device related to a target to be advertised on advertisement screen information.

FIG. 8 is a conceptual view illustrating a control method of displaying an external device related to a target to be advertised on advertisement screen information. The tuner 110 receives first advertisement data including first and second content items a1 and a2 related to fuel, and the wireless communication unit 190 receives first state information D1 from an external device. The controller 150 controls the display unit 170 to output screen information 500 according to the first content item 1 selected based on the first state information D1.

Also, the controller 150 controls the display unit 170 to output an icon 501 on the screen information 500 by using the first state information D1. The icon 501 may correspond to an image, text, and the like, denoting the external device which has transmitted the first state information D1. For example, the icon 501 may correspond to an image of the automobile, a photograph denoting the user's automobile, text corresponding to the automobile, and the like.

Accordingly, the user may consider recollect fuel to be fed to the user's automobile through association by the icon output to the screen information. Accordingly, since the advertisement content item regarding a target having a possibility of user demand and the external device of the user to which the target is to be applied are provided together, user's purchasing can be increased. Thus, an advertisement effect can be maximized.

Figure 9:
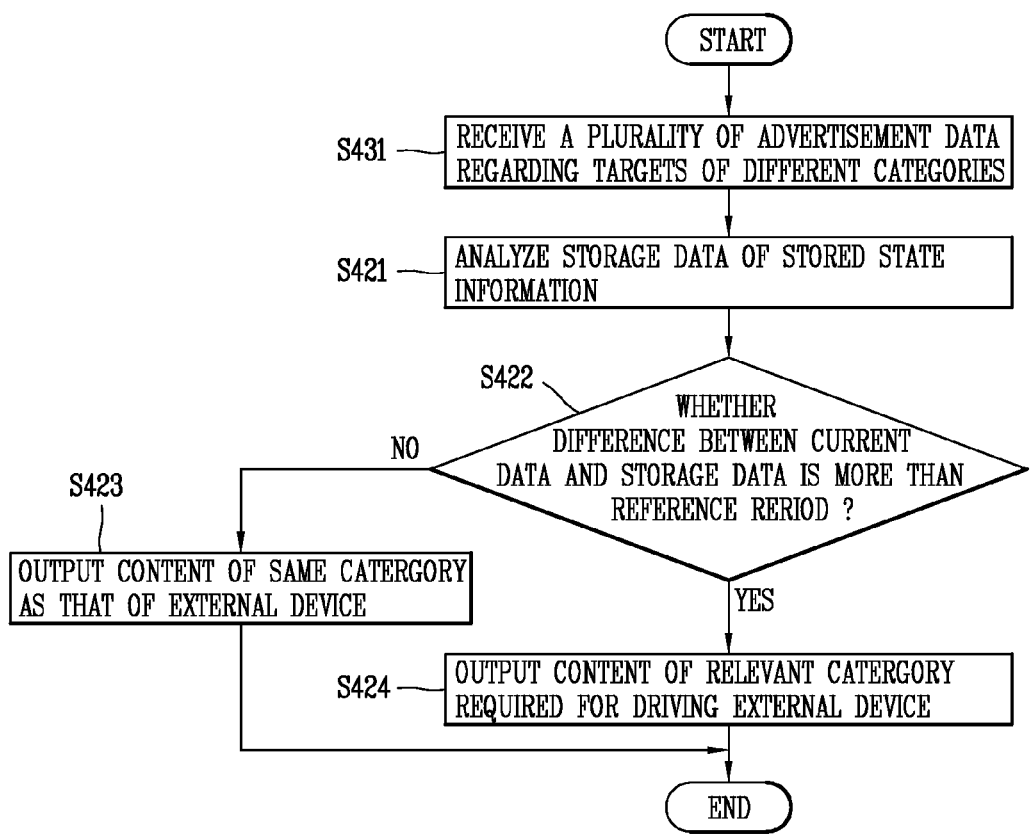
FIG. 9 is a flow chart illustrating a control method of selecting advertisement content based on date on which state information was stored in a video display device.

FIG. 9 is a flow chart illustrating a control method of selecting advertisement content based on date on which state information was stored in a video display device, and FIG. 10 is a conceptual view illustrating the control method of FIG. 9.

Referring to FIGS. 9 and 10, the tuner 110 receives a plurality of advertisement data A and B regarding targets of different categories. For example, the first advertisement data A includes a plurality of content items a1 and a2 regarding an automobile, and the second advertisement data B includes a plurality of content items b1 and b2 regarding fuel.

The controller 150 stores state information received from the external device, apart from the process of receiving the advertisement data. Also, when recent state information is received from the same external device, the controller 150 controls the memory 160 to delete previously stored state information and store the new state information.

The controller 150 analyzes a storage date on which the first state information D1 was stored in the memory in step S421. However, the present disclosure is not limited thereto and the first state information D1 may include information of a date on which the first state information D1 was generated.

The controller 150 determines whether a difference between the storage date and the current date is equal to or greater than a reference period in step S422. For example, the reference period may be set as a week, a month, a year, and the like, by the user. Also, the reference period may be set to be different according to types of the external devices. A reference period of a receiving unit which is frequently used by the user may be designated as a week or a reference period of the automobile may be designated as a month.

Referring to (c) of FIG. 10, when the difference between the current date and the reference date is not equal to or greater than the reference period, the controller 150 outputs advertisement data including a content item of a relevant category required for driving the external device in step S423. For example, in a case in which the reference period is set to 1 year and the first state information D1 was stored yesterday, the controller 150 selects the first advertisement data A including the content items a1 and a2 regarding fuel applied to the automobile.

Meanwhile, referring to (b) of FIG. 10, in a case in which the difference between the current date and the reference date is greater than the reference period, the controller 150 outputs advertisement data including a content item of the substantially same category as that of the external device in step S424. For example, in a case in which the first state information D1 was stored two years ago, the controller 150 selects second advertisement data B including the content items b1 and b2 regarding the automobile.

According to the present exemplary embodiment, the controller 150 receives newly updated state information from the external device. Also, when the external device is not driven, the controller 150 may not receive the state information. Accordingly, the controller 150 compares a date on which the state information was received and stored with the reference date, and when the state information was stored long before the reference date (or when there is no updated state information), the controller 150 determines that the external device has not been used by the user.

Accordingly, when the external device has not been used, the controller 150 provides advertisement data (and advertisement content items) for promoting purchase of goods (product) of the same category as that of the corresponding external device. Also, in a case in which state information based on recent driving of the external device has been stored, the controller 150 provides advertisement data (and advertisement content items) of a target applied to be used in the external device.

Accordingly, by providing information regarding a target required for the user, an advertisement effect can be enhanced.

Figure 11:
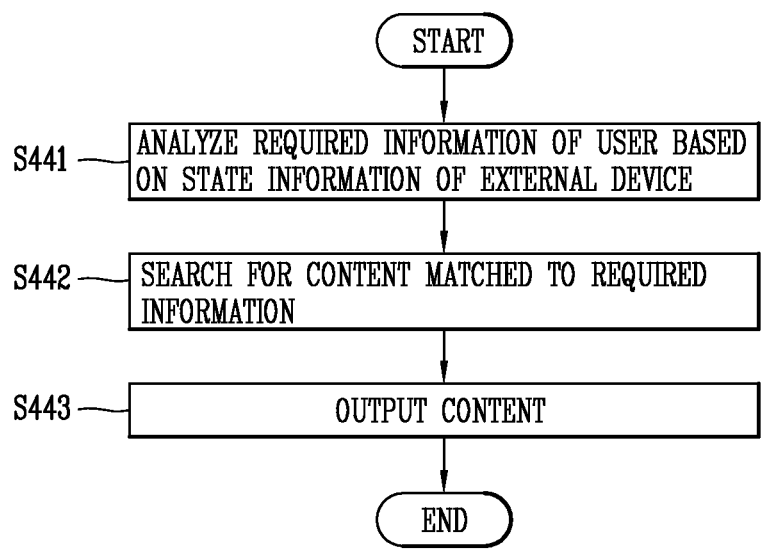
FIG. 11 is a conceptual view illustrating a control method of providing advertisement content according to information required for a user based on state information.

FIG. 11 is a conceptual view illustrating a control method of providing advertisement content according to information required for a user based on state information, and FIG. 12 is a conceptual view illustrating the control method of FIG. 11 according to an exemplary embodiment of the present disclosure.

The controller 150 analyzes required information of the user based on state information of an external device in step S441. Referring to FIG. 12, the controller 150 controls the wireless communication unit 190 to receive sixth state information D6. For example, in a case in which the external device is an air-conditioner, the sixth state information D6 may include the number of times of using the air-conditioner, a desired temperature adjusted by the user, a usage time of the air-conditioner, the current temperature, and the like.

Based on the sixth state information D6, the controller 150 may generate required information indicating that the user feels hot, and estimate a user's intention that he or she does not want to feel hot.

The controller 150 searches for a content item matched to the required information, among first and second content items j1 and j2 included in received seventh advertisement data J in step S442, and provides matched content item in step S443.

For example, the first content item j1 may include information promoting ice cream, and the second content item j2 may include information promoting coffee beverage. Based on the sixth state information D6 according to driving of the air-conditioner, the controller 150 estimates required information of the user who wants to cool off, and selects the first content item j1 based on the required information.

Also, the video display device may further include a sensing unit for sensing the current state. For example, the sensing unit may be configured as a sensor for sensing a time, a temperature, humidity, and the like.

The controller 150 may estimate the required information by using the current state sensed by the sensing unit and the sixth state information. For example, in a case in which it is sensed that the current date corresponds to summer based on the current state and the air-conditioner is continuously driven for a particular period of time based on the sixth state information D6, the controller 150 may estimate the required information as a target for cooling off.

The controller 150 controls the display unit 170 to output eighth screen information 580 corresponding to the first content item j1.

According to the present exemplary embodiment, in a case in which there is no content item matched to the advertisement data received from the tuner 110 and the state information of the external device, the controller 150 may generate required information of the user by using the state information.

Accordingly, the video display device 100 may provide advertisement data by recognizing a user's intention by using state information of an external device, as well as advertisement data regarding a target required for driving the external device. Thus, an advertisement effect can be enhanced.

The configuration and method of the video display device 100 according to the embodiments of the present disclosure described above are not limited in its application, but the entirety or a portion of the embodiments may be selectively combined to be configured into various modifications.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A video display device performing wireless communication with a plurality of external devices, the video display device comprising:
    a display unit;
    a memory storing state information of an external device formed according to driving of the external device and;
    a receiving unit transmitting or receiving at least one of the state information and advertisement data selectively outputtable to the display unit; and
    a controller controlling the display unit to output at least a portion of the advertisement data matched to the state information of the external device,
    wherein:
    the state information includes information regarding the external device itself and information related to driving of the external device,
    the memory stores information regarding a storage date on which the state information was stored together,
    when a difference between the storage date and the current date is longer than a preset reference period, the controller outputs advertisement data matched to the information regarding the external device itself, and
    when the difference between the storage date and the current date is shorter than or equal to the preset reference period, the controller controls the display unit to output advertisement data matched to the information related to driving of the external device.

2. The video display device of claim 1, wherein the state information includes data stored in a storage unit of the external device by a user, and the data includes at least one among text, an image and a voice.

3. The video display device of claim 1, wherein the advertisement data matched to the information related to the driving of the external device corresponds to information related to a target used to drive the external device and a target driven together with the external device.

4. The video display device of claim 1, wherein advertisement data includes a plurality of differentiated content items, and
    when the display unit is activated, the controller controls the receiving unit to transmit the state information to a preset server and to selectively receive a content item matched to the state information among the plurality of content items.

5. The video display device of claim 1, wherein the controller controls the receiving unit to receive a plurality of differentiated content items included in advertisement data in real time, and
the controller controls the display unit to output a content item matched to the state information, among the plurality of content items.

6. The video display device of claim 5, further comprising:
a camera configured to capture an image of an external environment,
wherein the controller analyzes external information of the external environment included in the image and selects the content item matched to the external environment information together with the state information.

7. The video display device of claim 5, wherein when the content item matched to the state information does not exist, the controller selects a preset basic content item among the plurality of content items.

8. The video display device of claim 1, wherein the controller controls the display unit to output advertisement data to which additional state information received from a different external device and the state information are matched together.

9. The video display device of claim 6, wherein the controller controls the display unit to combine screen information corresponding to the selected content item and the image and output the same.

10. The video display device of claim 6, wherein advertisement data includes a plurality of content items of different versions with respect to a single target, and
when the plurality of content items correspond to screen information in which at least one of a shape, a color, a size, and a usage state is differently displayed, the controller controls the display unit to output screen information related to at least one of a shape, a color, a size, and a usage state of at least one object included in the image.

11. The video display device of claim 1, wherein additional information indicating a type of the external device is received together with the state information, and
the controller controls the display unit to output screen information including a graphic image of the external device based on the additional information and the matched advertisement data.

12. The video display device of claim 1, wherein when the display unit is activated based on unique information input by a user, the controller controls the display unit to output advertisement data based on the state information including the unique information.

13. The video display device of claim 1, wherein the controller controls the display unit to output screen information corresponding to advertisement data, and
the display unit outputs an icon denoting the external device together with the screen information.

14. The video display device of claim 1, wherein the controller estimates required information corresponding to a target desired by a user based on state information generated according to driving of the external device, and
the controller selects a content item matched to the required information.

15. The video display device of claim 14, further comprising:
a sensing unit configured to sense current state of the video display device,
wherein the controller estimates the required information by using the current state together with the state information.

16. A method for controlling a video display device, the method comprising:
receiving, via a processor, state information according to driving of an external device;
storing, via a memory, the state information;
receiving, via the processor, advertisement data including a plurality of content items outputtable to a display unit in real time;
selecting, via a controller, a content item matched to the state information of the external device;
outputting, via the controller, screen information corresponding to the selected content item to the display unit; and
when the state information includes information regarding the external device itself and information related to driving of the external device, comparing a difference between a date on which the state information was stored and the current date with a preset reference period,
wherein the selecting of a content item matched to the state information of the external device comprises:
when the difference is longer than the preset reference period, selecting a content item matched to the information regarding the external device itself, and
when the difference is shorter than or equal to the preset reference period, selecting a content item matched to the information related to driving of the external device.

17. The method of claim 16, further comprising:
sensing the current state of the video display device;
estimating required information corresponding to a target desired by the user based on the current state and the state information of the video display device according to driving of the external device; and
selecting a content item based on the required information.

* * * * *